United States Patent [19]
Petitto et al.

[11] Patent Number: 5,400,177
[45] Date of Patent: Mar. 21, 1995

[54] TECHNIQUE FOR DEPTH OF FIELD VIEWING OF IMAGES WITH IMPROVED CLARITY AND CONTRAST

[76] Inventors: Tony Petitto, 150 W. 51st St., Suite 2007, New York, N.Y. 10019; Stanislaw Loth, 44 Normandy Village - 14, Nanuet, N.Y. 10954

[21] Appl. No.: 155,748
[22] Filed: Nov. 23, 1993
[51] Int. Cl.6 .............................................. G03B 21/56
[52] U.S. Cl. ...................................... 359/451; 348/44
[58] Field of Search ............... 359/451, 448, 449, 456, 359/460, 478; 348/44, 59, 832

[56] References Cited

U.S. PATENT DOCUMENTS

| | | | |
|---|---|---|---|
| 2,889,739 | 6/1959 | Moore | 88/16.6 |
| 2,891,444 | 6/1959 | Ewald | 88/29 |
| 3,784,742 | 1/1974 | Burnham et al. | 178/7.88 |
| 3,820,873 | 6/1974 | Redington et al. | 350/124 |
| 4,078,854 | 3/1978 | Yano | 350/128 |
| 4,158,481 | 6/1979 | Hoyer | 350/144 |
| 4,309,074 | 1/1982 | Granieri, Jr. | 350/144 |
| 4,414,565 | 11/1983 | Shanks | 358/89 |
| 4,621,897 | 11/1986 | Bonnet | 350/130 |
| 4,772,094 | 9/1988 | Sheiman | 350/133 |
| 4,871,233 | 10/1989 | Sheiman | 350/286 |
| 4,927,238 | 5/1990 | Green et al. | 350/130 |
| 5,061,052 | 10/1991 | DeJesus | 359/742 |
| 5,146,365 | 9/1992 | Minoura et al. | 359/619 |

FOREIGN PATENT DOCUMENTS

| | | | |
|---|---|---|---|
| WO81/01201 | 4/1981 | WIPO | G02B 27/22 |

Primary Examiner—Richard A. Wintercorn
Attorney, Agent, or Firm—Howrey & Simon

[57] ABSTRACT

A screen is disclosed for viewing depth of field images. The screen includes a curved prismatic screen mounted between a flat image and a viewer. A light hood may be provided to reduce glare and other effects of ambient light. Further protection from ambient light may be provided by coating the screen with an anti-reflective coating. Image quality for a video image or the like is provided by restructuring the image into smaller image elements. The present invention may find particular application in medical and obstetric imaging such as sonograms, musculo-skeletal imaging, vascular imaging, angiograms, angioplasty, dental probes, catheter probes, ear probes, endoscopy, laparoscopy, pelviscopy and arthroscopy.

36 Claims, 28 Drawing Sheets

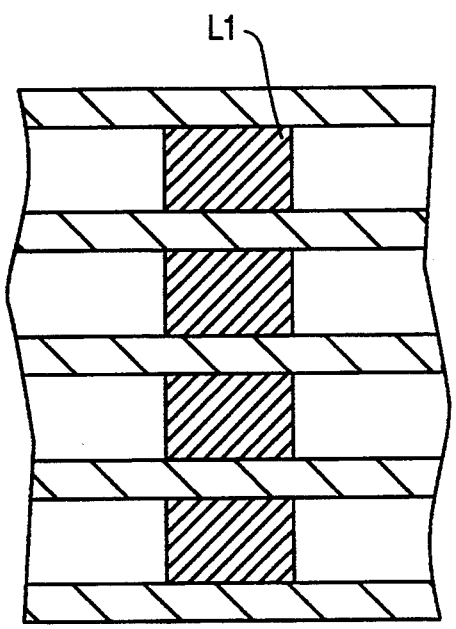
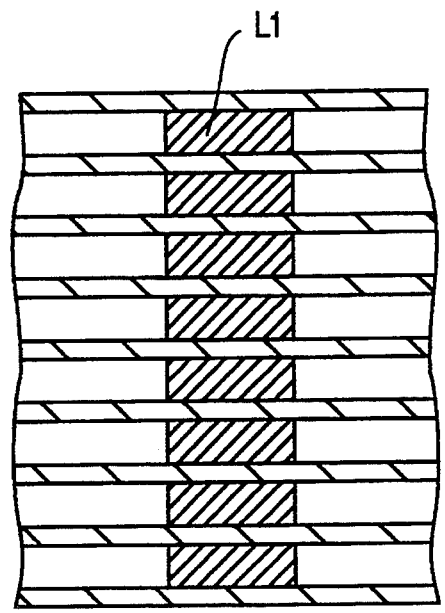
FIG. 33(a)    FIG. 33(b)
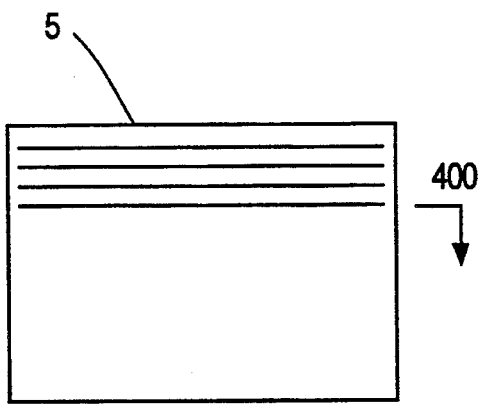
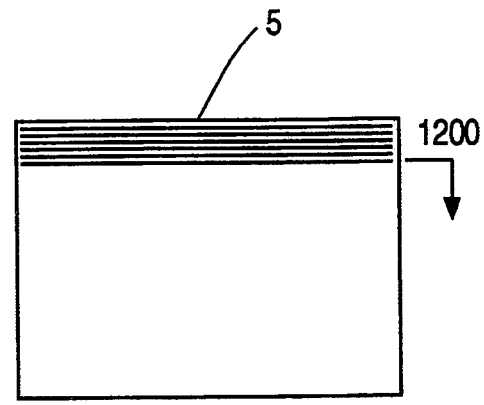
FIG. 34(a)    FIG. 34(b)

TECHNIQUE FOR DEPTH OF FIELD VIEWING OF IMAGES WITH IMPROVED CLARITY AND CONTRAST

BACKGROUND OF THE INVENTION

The present invention relates to a technique for viewing depth of field images. More particularly, the present invention relates to a curved prismatic screen which takes advantage of depth cues in a flat-type image to permit a viewer to see most of the depth of field elements that exist in the real image. Furthermore, the present invention relates to a technique for reducing grain in an image and providing increased contrast and improved clarity in the image.

There currently are a number of optically or electronically guided depth of field systems for still photography, television, film, video and the like. These current systems are typically based on human eye stereopsis rules whereby two separate images, taken at the distance of the eyes, are separately provided to the respective eyes of the viewer. Examples of these types of systems are described below in connection with FIGS. 1-4.

Referring to FIG. 1, one known technique for providing a stereoscopic image utilizes a stereo pair of photographic images a and a' and a pair of half lenses 1 and 1'. In operation, the half lenses 1 and 1' cause an observer to view a fused stereoscopic image c which includes apparent depth information. As a result, a viewer will perceive a three-dimensional effect in the fused image.

FIG. 2 illustrates a system useful for providing three-dimensional images for a motion picture or the like. A pair of film images a and a' are projected by lenses 3 and 3' through polarizing light filters 5 and 5', respectively, onto a metallic nondepolarizing screen 7. A viewer wears appropriate polarizing glasses 9, which allow each of the viewers' eyes to see the corresponding film image a or a'. As a result, a fused stereoscopic apparent image c is "seen" by the viewer for a three-dimensional effect.

A third known device for producing stereoscopic images is illustrated in FIG. 3. A stereo pair of video cameras 11 and 11' converge at a point f to provide video camera images a and a', respectively, for simultaneous display on video screen 15. A pair of shutters 17 and 17' allow alternate viewing of the video display by the viewer. Only one eye is exposed to the image at any given moment. As a result, the viewer perceives a three-dimensional effect in the image.

A number of techniques for producing stereoscopic images are described in patent literature. For example, PCT Application No. WO 81/01201 to Shanks describes a system which produces a distorted plane image of a scene and causes observation of the distorted image on a saddle-shaped surface to give a three-dimensional presentation of the scene. Other techniques are described, for example, in U.S. Pat. No. 2,889,739 to Moore; U.S. Pat. No. 2,891,444 to Ewald; U.S. Pat. No. 4,078,854 to Yano; U.S. Pat. No. 4,158,481 to Hoyer; U.S. Pat. No. 4,621,897 to Bonnet; U.S. Pat. Nos. 4,772,094 and 4,871,233 to Sheiman; and U.S. Pat. No. 4,927,238 to Green et al.

Each of the foregoing techniques is based on stereopsis, three-dimensional depth rules. Referring now to FIG. 4, the eyes of a viewer v are converged at a point b. As an example of depth rules, an object placed closer than convergence point b appear to be shifted left at point c. Objects placed further than convergence point b appear shifted right at point d.

Although existing three-dimensional imaging systems simulate stereopsis of the eyes fairly effectively, they require a special camera attachment, a two camera arrangement, or other means, to provide two images for a stereo pair. The stereo pair images require a device to separate them during viewing so that each eye of the viewer can see only one image of the stereo pair.

Due to the need for special camera systems and other equipment, shooting and recording images in three-dimensions is difficult, and viewing is restricted by the requirement of special glasses, eye shutters or similar devices. Three dimensional viewing systems are complicated, are commonly considered to be a gimmick, cause eye strain during viewing, and are expensive. Accordingly, they have not been accepted by the public or commercial film and video markets for any sustained period of time.

BRIEF OBJECTS AND SUMMARY OF THE INVENTION

It is a primary object of the present invention to provide depth of field images without the shortcomings associated with prior stereoscopic imaging systems.

It is a further object of the present invention to provide a technique for displaying a planar image in a depth space with most of the image depth elements.

It is another object of the present invention to provide an image with reduced grain, noise, and radiation which is harmful to the eyes.

It is yet another object of the present invention to provide an image with increased contrast and improved clarity.

Briefly, the preferred embodiments achieve the foregoing objects in a system including a screen which causes a viewer to interpret depth cues present in a flat image as if they provided real depth information. Various embodiments in accordance with the present invention include a curved prismatic screen which may be arranged between a viewer and a planar image to be viewed. A curved lenticular screen is also available. Reduced graininess and improved contrast and clarity may be provided for a video image by restructuring the image into a number of resolution lines greater than the number of scan lines in the original video image. To enhance image quality, improve image contrast, and reduce glare, an anti-reflective coating may be provided on the screen.

BRIEF DESCRIPTION OF THE DRAWINGS

The foregoing objects, as well as additional objects, features and advantages of the present invention, will be apparent from the following detailed description of the preferred embodiments when read in light of the accompanying drawings, wherein:

FIG. 24 illustrates the manner in which the eyes and brain perceive a flat image on a video monitor screen or the like;

FIG. 33(a) is a magnified view of video screen resolution lines, showing an image of a vertical line;

FIG. 33(b) is a magnified view of video screen resolution lines illustrating the vertical line image of FIG. 33(a) restructured into smaller elements in accordance with the present invention;

FIGS. 34(a) and 34(b) respectively illustrate a video monitor screen with four hundred image resolution scan lines, and a video monitor screen restructured into 1200 image resolution lines in accordance with the present invention;

DETAILED DESCRIPTION OF THE PREFERRED EMBODIMENTS

Although the present invention is described below in connection with specific preferred embodiments, it will be appreciated that the invention is not limited to the described embodiments. For example, although the preferred embodiments are described in connection with medical imaging systems, applicability of the present invention may also be found in flight simulator systems, virtual reality displays, computer-aided design systems, surveillance systems, and other environments in which image depth of field and/or improved image clarity and contrast are important. A number of additional applications in medical imaging systems are also available. For example, the present invention may find application in medical and obstetric imaging such as sonograms, musculo-skeletal imaging, vascular imaging, angiograms, angioplasty, dental probes, catheter probes, ear probes, endoscopy, laparoscopy, pelviscopy and arthroscopy. Other areas of application will be readily apparent to skilled artisans.

Figure 1:
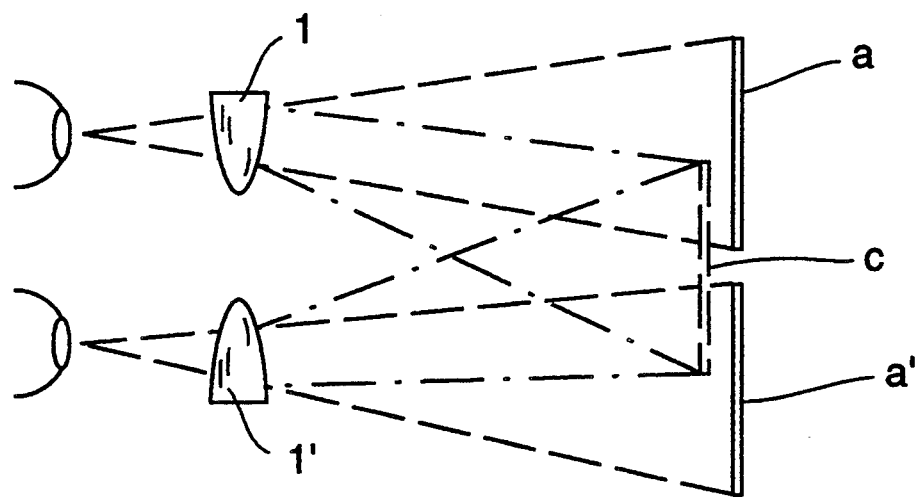
FIG. 1 is a schematic illustration of a prior an three-dimensional viewing system for use with still photographs.
Figure 2:
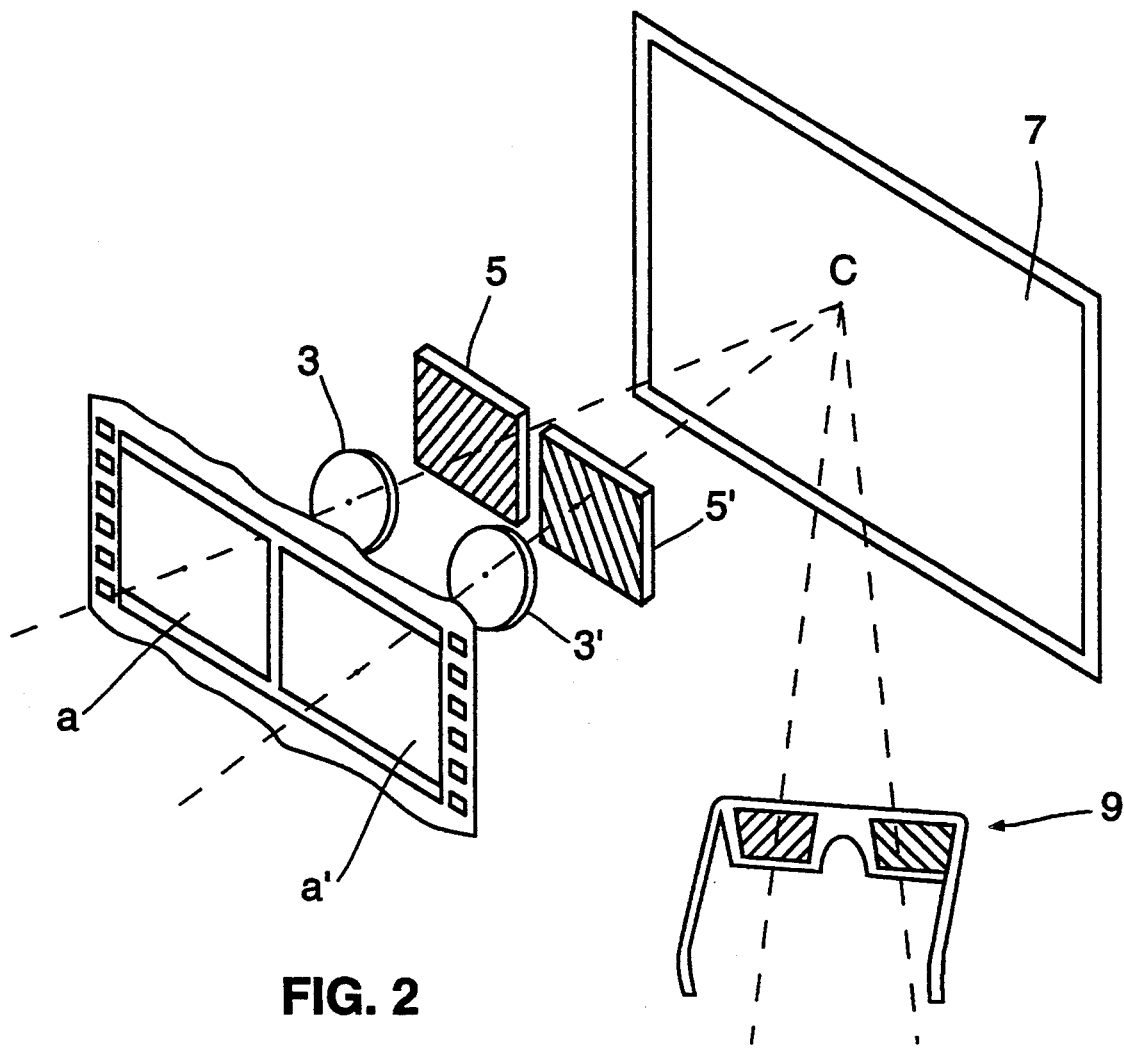
FIG. 2 is a schematic illustration of a prior an three-dimensional viewing system including a polarized film/-screening arrangement and polarized viewing glasses.
Figure 3:
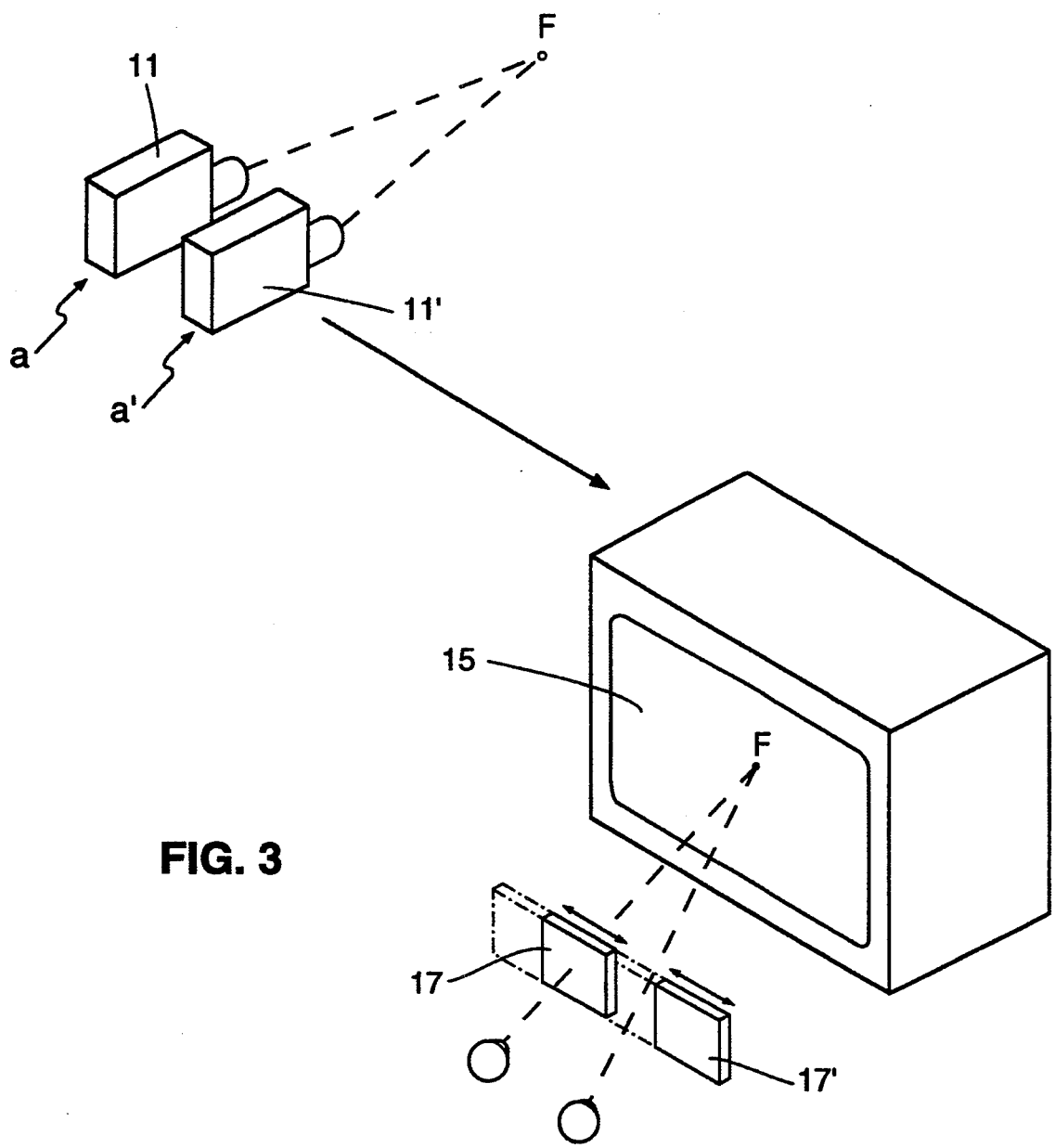
FIG. 3 is a schematic illustration of a prior an three-dimensional video viewing system utilizing a stereo pair of video cameras and a viewing shutter arrangement.
Figure 4:
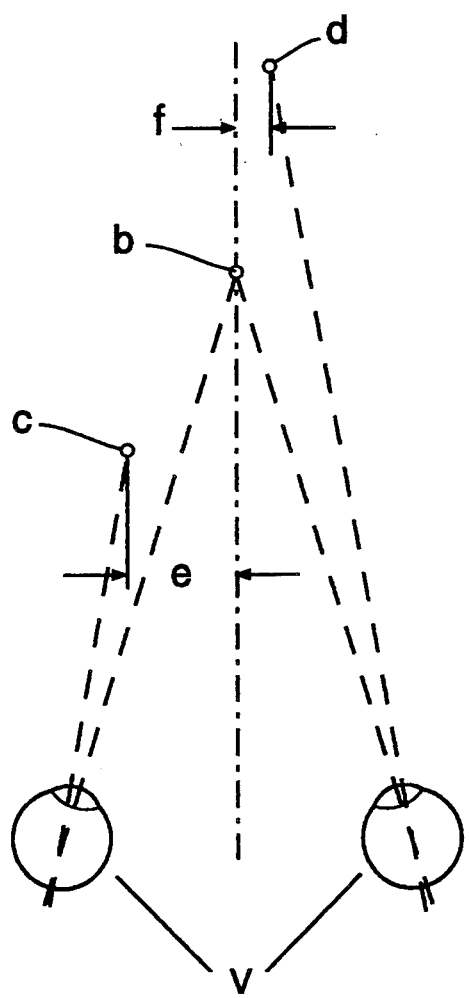
FIG. 4 illustrates a demonstration of three-dimensional stereopsis.
Figure 5:
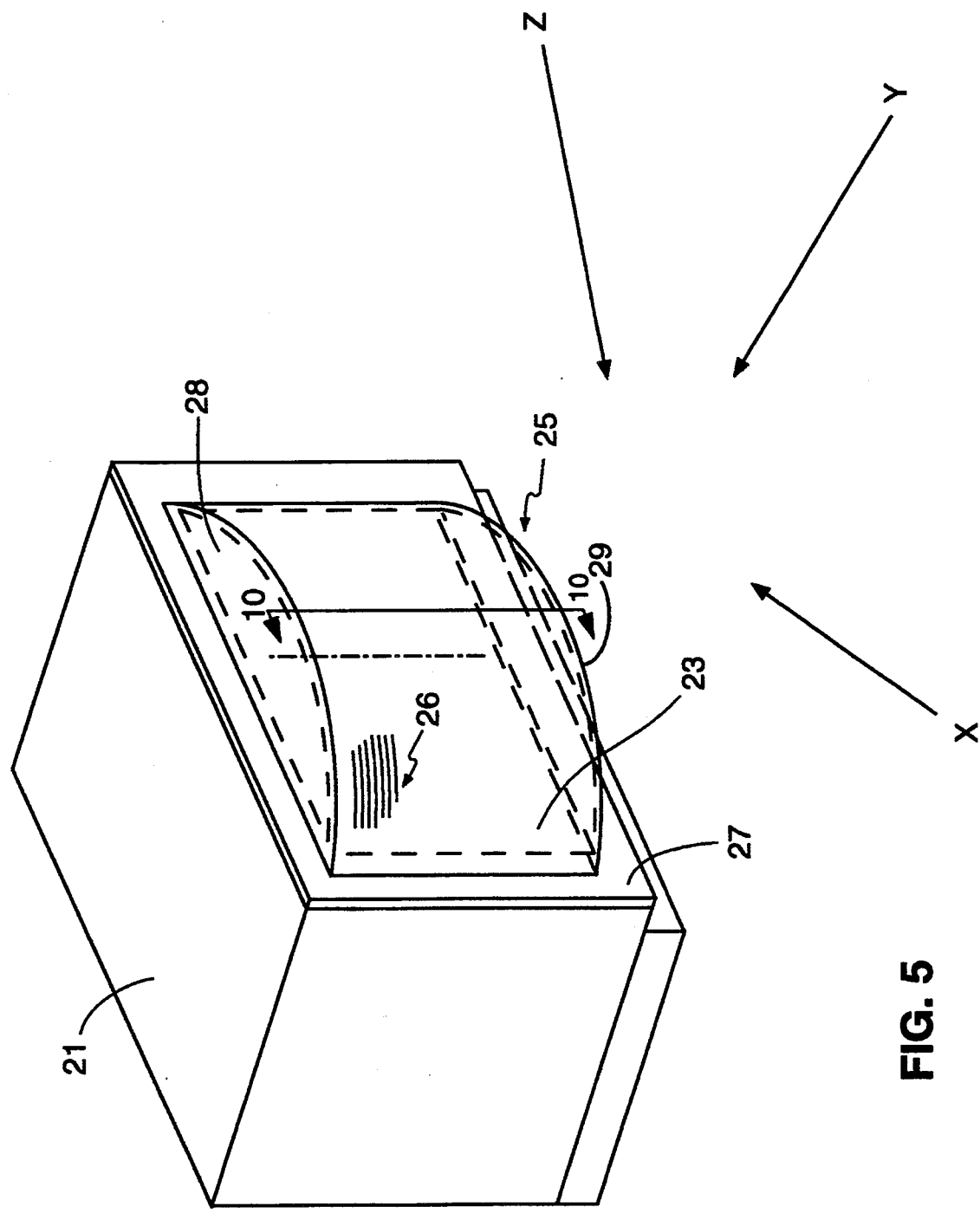
FIG. 5 is a perspective view of a first preferred embodiment of a depth of field screen in accordance with the present invention, including a depth of field curved prismatic screen.

Referring now to FIG. 5, a standard 13" or 19" video monitor 21 includes a video screen 23. A curved depth of field screen 25 is provided in front of the video screen 23. As will be described below in greater detail, the depth of field screen 25 is preferably a multi-prismatic structure with a plurality of horizontal microprisms 26 extending across the width of the inner surface of the depth of field screen 25. The curved depth of field screen 25 may be held in a frame 27 which is fitted to the video monitor 21. The frame 27 covers the space between the video screen and the outside wall of the monitor and is, preferably designed to allow access to adjustment knobs and controls on the video monitor 21. The top portion 28 and the bottom portion 29 of the depth of field screen 25 may be provided with black masks to reduce ambient light behind the depth of field screen 25. As an alternative to providing a separate depth of field screen for attachment to a video monitor, the depth of field screen may be integrated with the video monitor at the time of manufacture.

The depth of field screen 25 is preferably made of an optic grade plastic and preferably includes at least three horizontal prisms 26 for each scan line of the video monitor. Ideally, the screen may include a prism density of between 60 prisms per inch and 160 prisms per inch. Improved results generally will be obtained with increased density of prisms. However, manufacture of the screen may become more complex and expensive with high prism densities.

One material useful for manufacture of the depth of field screen 25 is a polycarbonate sheet material with haze of less than 1% and bulk absorptivity of less than 50 dB/m. The polycarbonate sheet preferably has a caliper of 0.018" ±0.003", a distortion temperature of at least 265° F., and fairly high tensile strengths. As alternatives, an optical grade acrylic or other transparent plastic or glass material may be used.

The micro prisms 25 may be formed by any appropriate technique such as cutting, shaping, molding or the like. In the preferred manufacturing technique, described in greater detail in connection with FIG. 40, a transparent sheet of screen material is milled to form the microprisms. The milled sheet may then be polished and coated with an anti-reflective coating. The anti-reflective optical coating helps enhance the quality of the image, increase contrast, and reduce glare and ghosting of the image. Depending upon the application, the prisms may be either symmetric or asymmetric and have sides angled from 60' to 120' relative to one another.

The side portions of the sheet are then fitted into the frame 27 so that, in use, they will be adjacent the video screen 23. The screen curves away from the video screen toward the center portion of the depth of field screen, reaching its greatest distance from the video screen at the center line. For a 19" video monitor screen, the depth of field screen may be approximately 7" from the video screen at the center line. The curvature of the prismatic screen allows viewing from a variety of angles such as x, y and z, and plays a significant role in restoring the depth effect.

Figure 6:
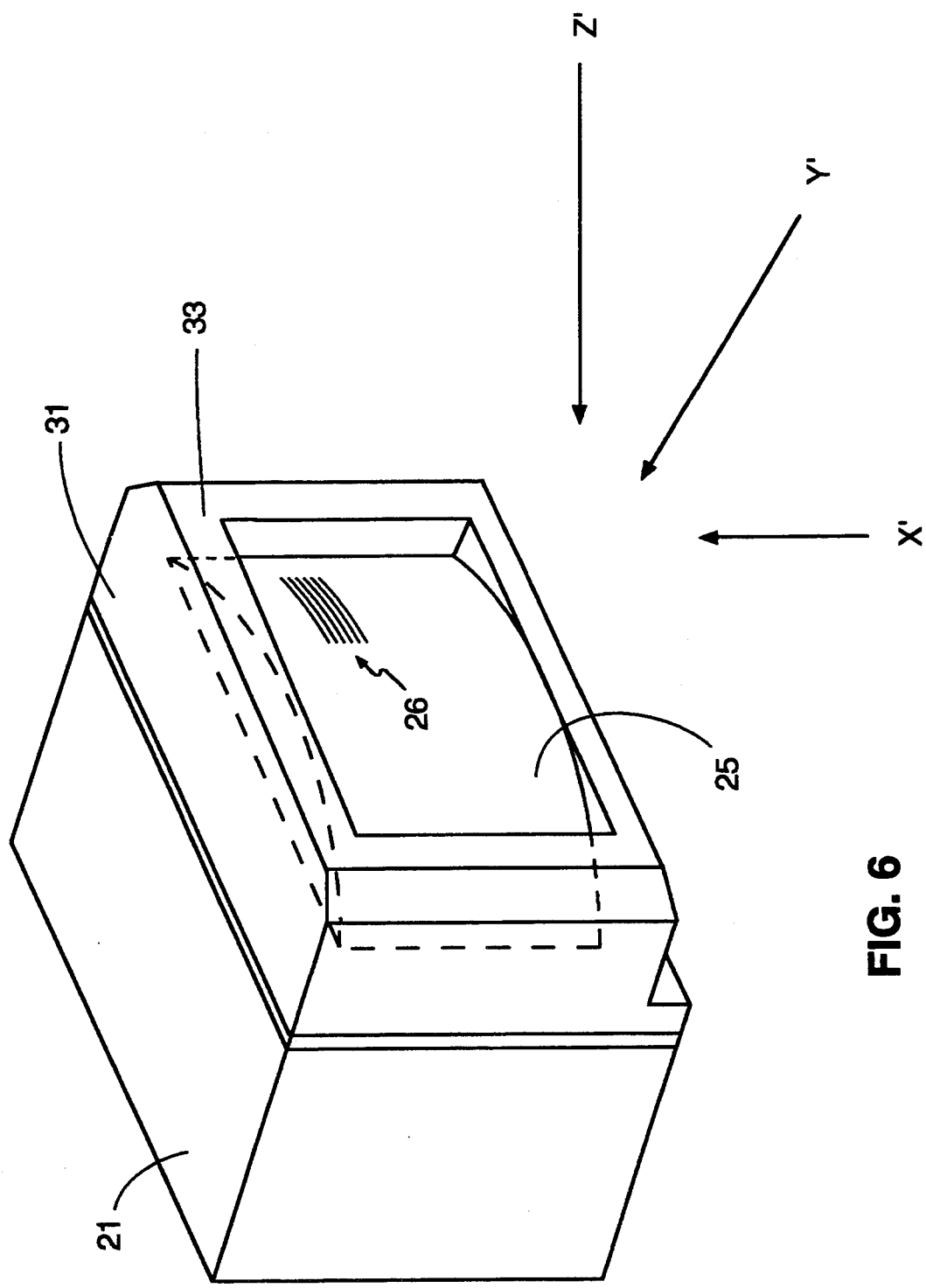
FIG. 6 is a perspective view of a second embodiment of a depth of field screen in accordance with the present invention.

Turning now to FIG. 6, a second embodiment of the depth of field screen is illustrated which is particularly suitable for medical use in depth of field high precision viewing with dental probes, internal body probes and operations, bone and bone joint probes and operations, angiograms, angioplasty procedures and catheter probes. Such medical uses often involve viewing a monitor in a brightly lit room with lights surrounding the monitor, but the viewing may be limited to a narrower range of angles x', y', z'. This embodiment is also particularly suitable for use in depth of field high precision viewing of commercial design applications that are viewed on a television, video or computer monitor.

As shown in FIG. 6, the depth of field prismatic screen 25 is fitted with a light shading hood 31, which shields the screen from the top, bottom and sides. Additionally, a front frame may be provided to protect the depth of field screen 25 from lights in front of the monitor.

The size of the front frame 33 may depend upon the application and viewing conditions. For example, in a situation with a number of lights in front of the screen, it would be desirable to have a relatively large front frame 33. This, however, might reduce the available viewing angles x', y', z' to an unacceptable degree. Accordingly, an adjustable front frame 33 would allow a viewing to better control the viewing conditions.

In some medical procedures, a probe will provide only a small image, even on a 19" viewing monitor. For example, a probe used in lacrimal tear duct endoscopy operations provides a circular image less than 2" in diameter on a 19" video monitor. In such situations, it is preferable to provide the depth of field screen in front of the useable portion of the image only.

Figure 7:
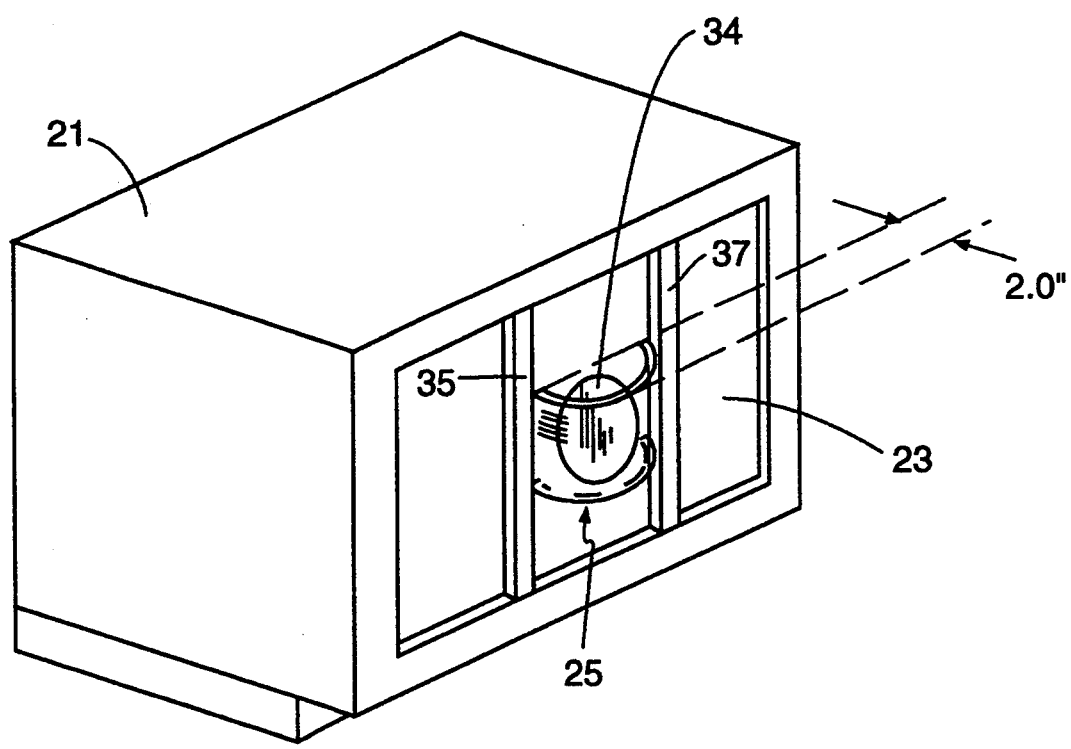
FIG. 7 is a perspective view of another embodiment of a depth of field screen constructed in accordance with the present invention.

FIG. 7 illustrates an arrangement for depth of field viewing of a small image, 34 on a large video screen 23. A pair of vertical brackets 35 and 37 are attached to the video monitor 21 to support the depth of field screen 25. As an option, the depth of field screen 25 may be formed from a pair of curved prismatic sheets placed one above the other. For a 2" circular image 34, which is typical in lacrimal tear duct endoscopy operations, the center portion of the depth of field screen 25 preferably extends approximately 2" from the video screen 23. Also, in this application the inner portions of vertical support brackets are separated approximately three inches.

Figure 8:
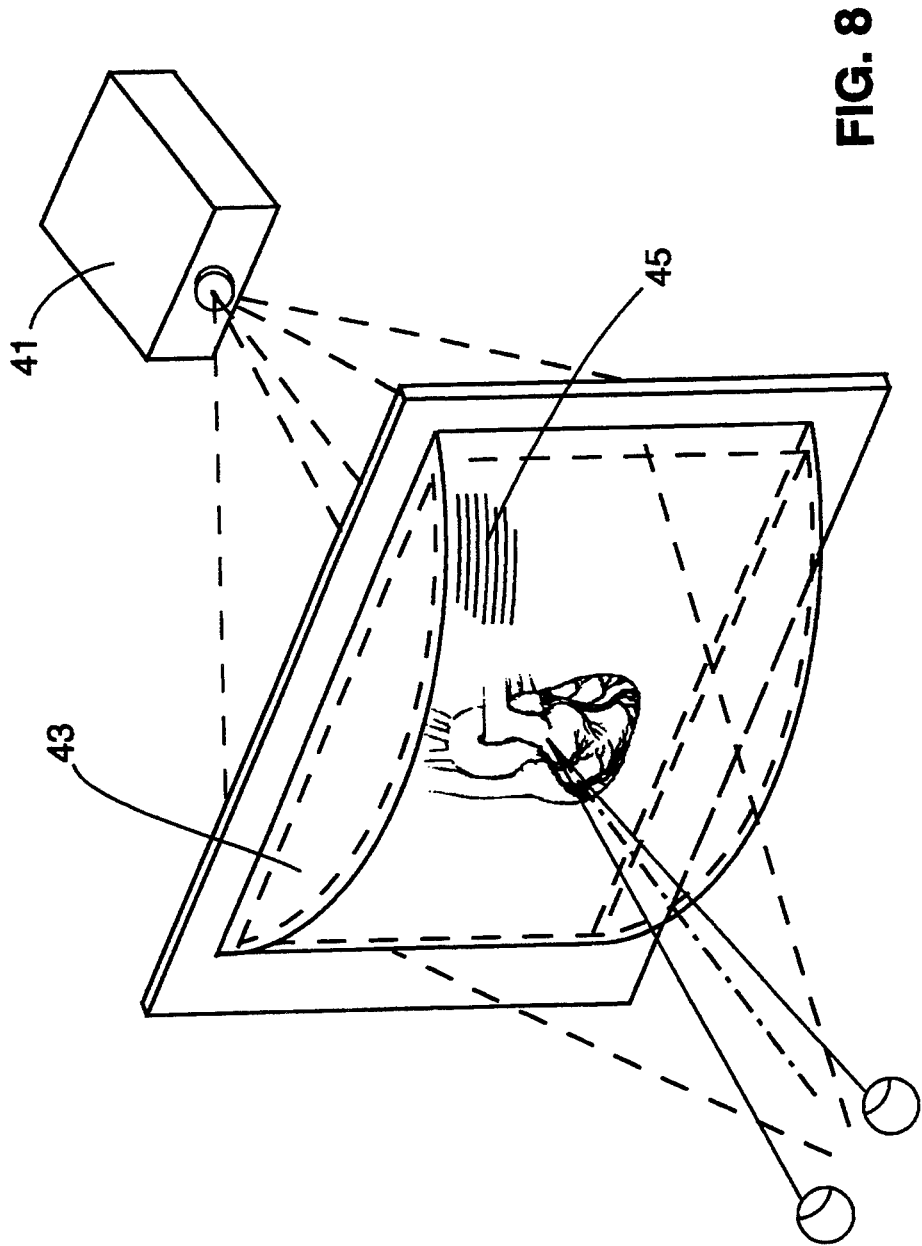
FIG. 8 is a perspective view of a depth of field screen in accordance with the present invention for use with a rear projection screen viewing system.

A depth of field viewing arrangement useful for watching a projected image such as a motion picture or photographic slides is shown schematically in FIG. 8. A projector 41 focuses a rear screen projected image on the rear of screen 43. The image is then viewed through a depth of field screen 45. Such an arrangement is particularly suitable for depth of field viewing of slide images of laparoendoscopic (interior body) surgery.

Figure 9:
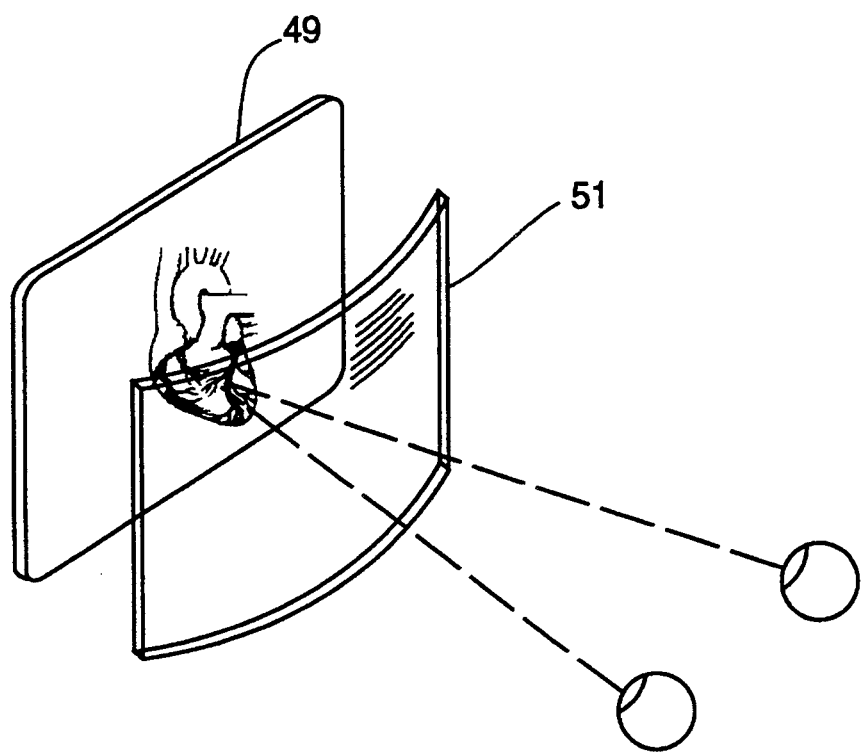
FIG. 9 is a perspective view of a depth of field screen in accordance with the present invention for use with viewing still images.

A depth of field viewing arrangement useful in connection with still photographs is illustrated in FIG. 9. As shown, a photograph 49 may be viewed through a curved prismatic screen 51 to provide depth of field. This arrangement could find application, for example, in depth of field, high precision viewing of real estate, wanted criminals, missing persons, accidents, insurance and court evidence reports that include still photographs.

Figure 10:
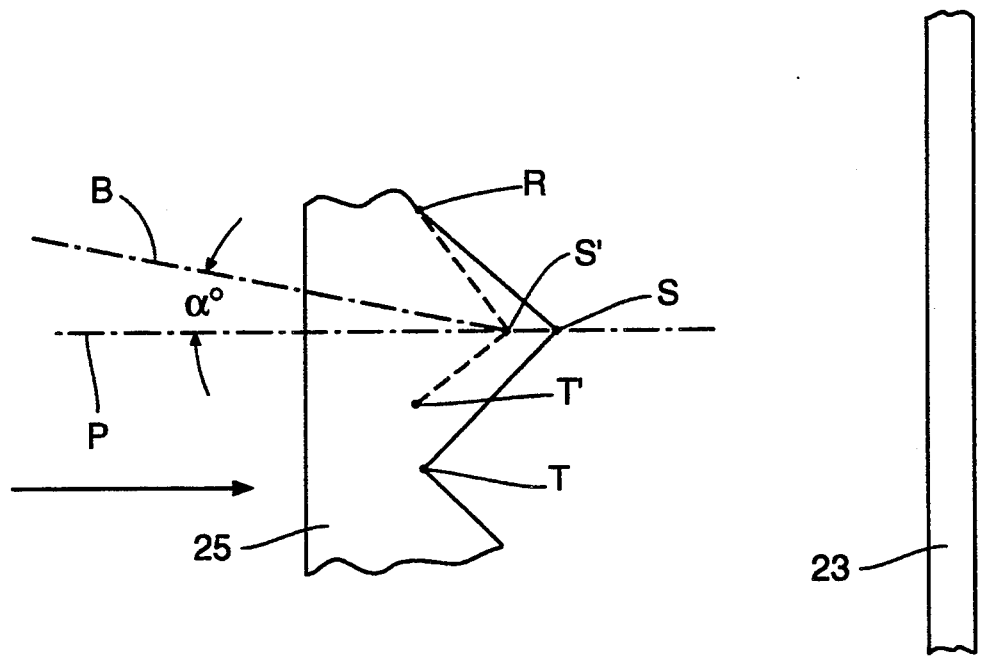
FIG. 10 is a sectional view of the preferred depth of field screen taken along lines 10—10 of FIG. 5.

FIG. 10 shows a sectional view of a portion of a curved prismatic screen in accordance with the present invention. In use, as indicated by the arrow, a viewer would look at the video screen 23 or other object through the depth of field prismatic screen 25. In the illustrated prismatic screen, a right angle prism is defined on the inner surface of the screen by the 90° angle between the points R, S and T. The prisms are preferably formed with an angle between 60° and 95°, but may vary from 60' up to 120'.

The prisms may be tilted either upwardly or downwardly up to 45°, depending on the viewer's angle of view and the dimensions of the image. More specifically, referring to FIG. 10, a line P is perpendicular to the flat outer face of the depth of field screen. A line B bisects the angle defining the prism. The angle $\alpha$ between the lines determines the degree of tilt of the prism. For example, the prism defined by points R, S', T' is tilted downwardly by $\alpha°$.

The number of prisms formed in the depth of field screen varies in accordance with the size of the video screen and the distance at which the viewer will be located. For a video monitor, the number of prism lines is at least equal to the number of video scan lines on the monitor. However, the number of prisms preferably varies from approximately three prisms per video image line to two or three times that number, resulting in from sixty prism lines per inch up to one hundred sixty or more prism lines per inch.

Figure 11:
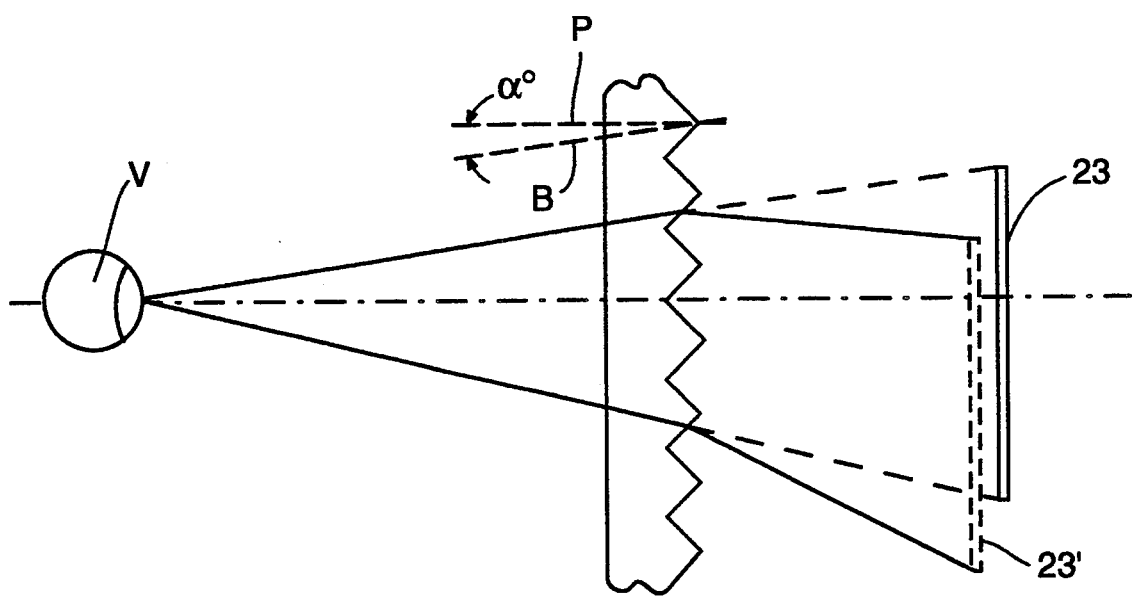
FIG. 11 is a sectional view of the preferred depth of field screen, illustrating a viewer looking at the center of a video monitor.

Turning now to FIG. 11, a depth of field screen 25 includes asymmetric prisms tilted upwardly by $\alpha°$. Due to this tilt, a viewer V looking at the center of the video screen 23 will see a video screen image 23' which is shifted downward from the actual level of the video screen 23. Similarly, prisms tilted downwardly would cause the screen image to shift upward. Such shifting may be desired, for example, when a video monitor is mounted either above or below the eye level of the viewer.

Figure 12:
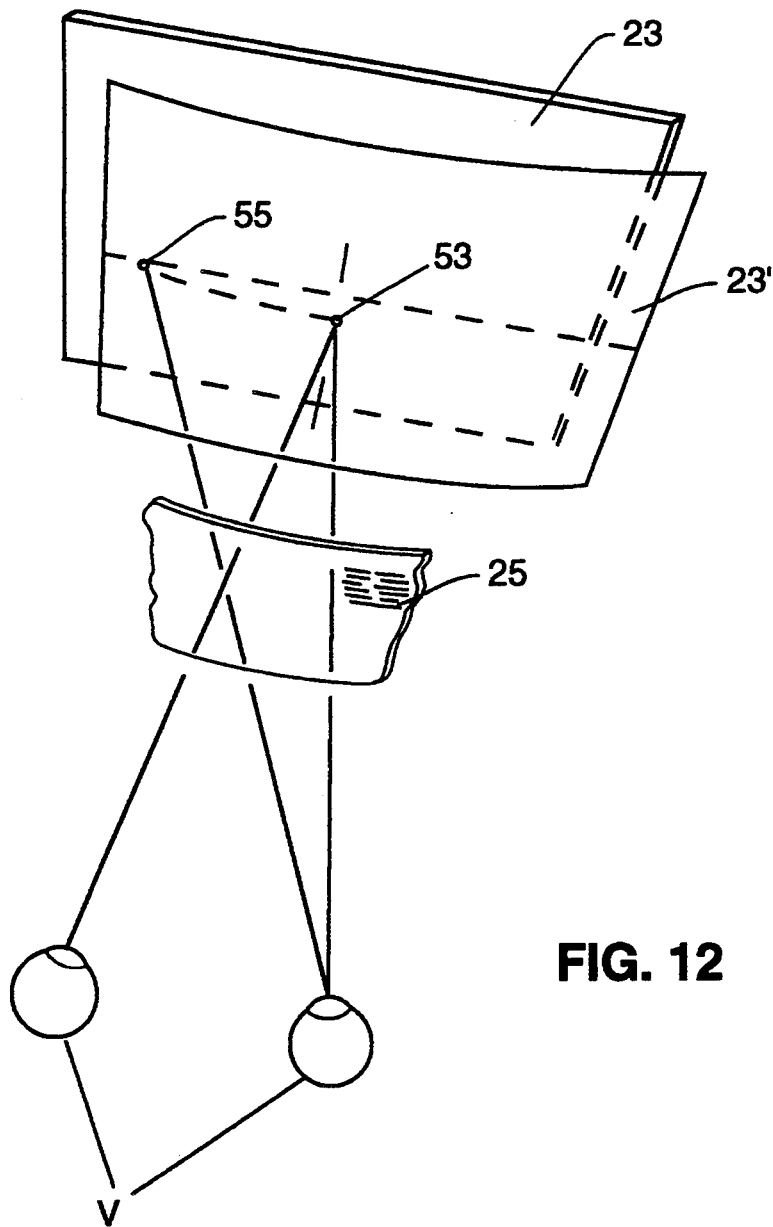
FIG. 12 is a perspective horizontal view of a depth of field screen in accordance with the present invention, illustrating eye focus and convergence points on a curved image surface.

FIG. 12 illustrates a perspective view of the FIG. 11 configuration. When viewing through the curved prismatic screen 25, the flat image on video monitor 23 is seen as a curved image 23'. Accordingly, the viewer's eyes are forced to change focus and converge when moved from point 53 in the image 23' to point 55. As a result, the viewer's brain is "confused" by the received image data and begins to analyze the image depth cues included in the flat image. These image depth cues are present to some extent in every flat image, whether photographed or recorded electronically.

Examples of depth cues classified as psychological cues are discussed below in connection with FIGS. 13-21. These psychological cues are perceived independently from the stereopsis and convergence ability of a viewer's eyes.

Figure 13:
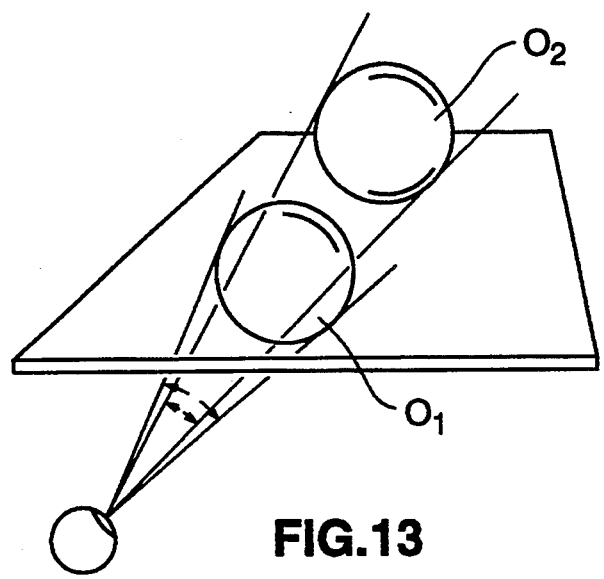
FIGS. 13-21 illustrate examples of depth cues of images which are useful in connection with the present invention.

In FIG. 13, object $O_1$ and $O_2$ are the same size but project different retinal image sizes due to their respective distances from the eye. As illustrated, the object $O_1$ subtends a larger angle in the eye's field of view than does the object $O_2$. Hence, the object $O_1$ is perceived by the brain as being closer than object $O_2$. In general, objects of the same size appear larger when they are closer to the eye, or smaller when they are further from the eye.

Figure 14:
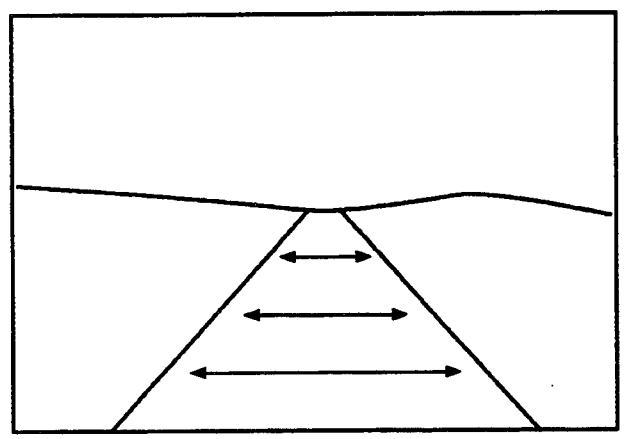

FIG. 14 illustrates the effect of linear perspective as a psychological depth cue. Objects such as a roadway which extend from the foreground into the distance appear smaller as they recede from the observer. Lines extending from their shapes appear to meet at a point on the horizon.

Figure 15:
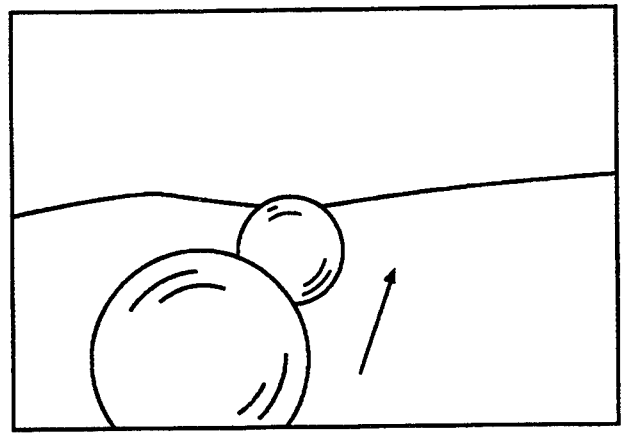

FIG. 15 depicts the role of interposition or overlapping as a depth cue. Briefly, an object placed in front of another covers a portion of the object in the distance. The brain readily interprets this indication of relative depth of the objects.

Figure 16:
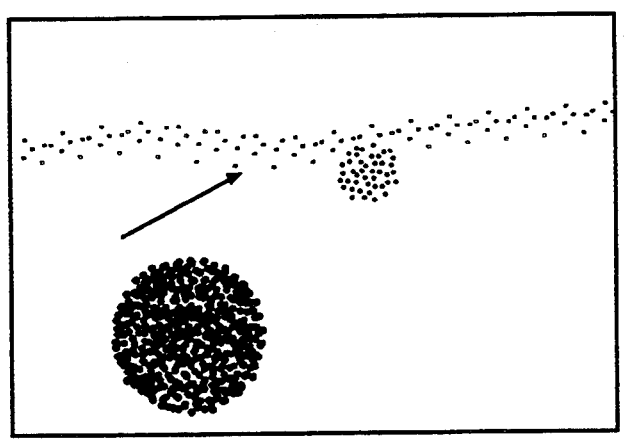

FIG. 16 illustrates aerial perspective as a depth cue. Very distant objects placed in bright illumination have a soft and light appearance. Dust particles in the air disperse light between the object and the viewer, thus reducing the contrast of objects in the distance.

Figure 17:
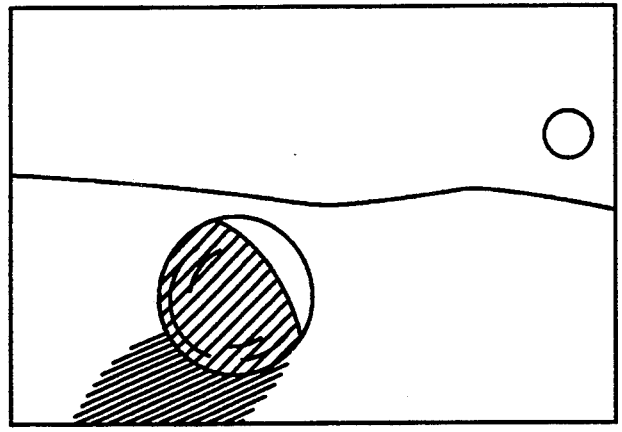

As shown in FIG. 17, light and shade help the brain interpret the depth of an object. For example, the angle of an object's shadow indicates its relative position to a source of light. Furthermore, illumination provides perception of which surface of an object is convex and which surface is concave.

Figure 18:
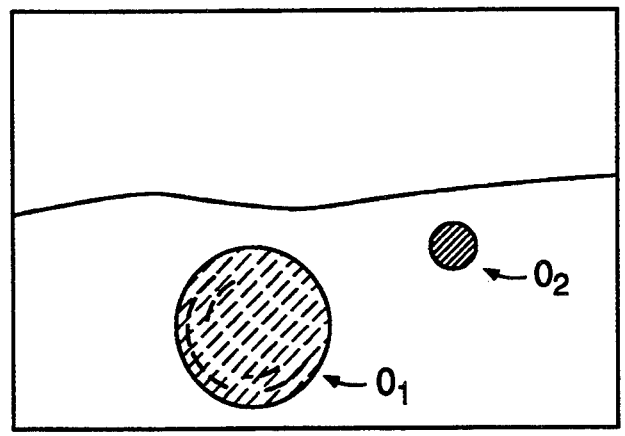

Textural gradient provides a further depth cue. Referring to FIG. 18, the texture of a close object $O_1$ is visible whereas the texture of a distant object $O_2$ is not visible. As a result, the brain will interpret an object in which the texture is visible as being relatively nearby.

Figure 19:
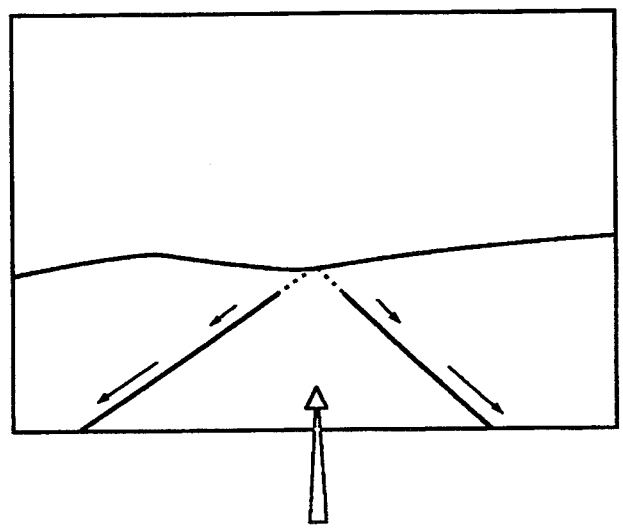
Figure 20:
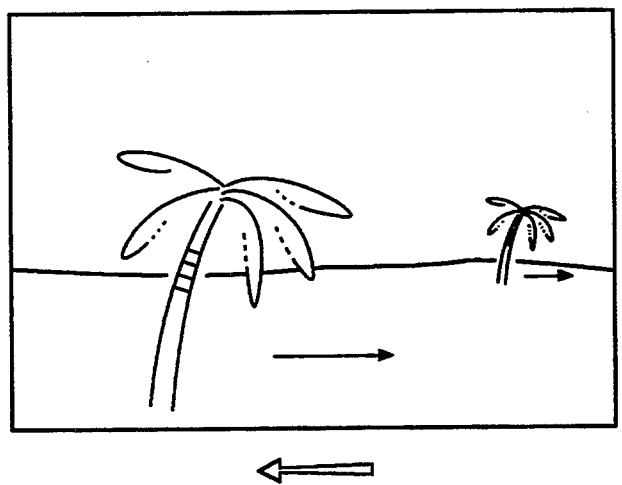

FIGS. 19 and 20 illustrate the role of motion parallax in providing depth cues. Referring to FIG. 19, as the viewpoint of an observer moves forward in the direction of the large arrow (e.g., in a video taken from a moving car or the like) nearby objects will appear to move faster than distant objects. Similarly, in FIG. 20 as a viewer scans from right to left in the directions of the large arrow, objects in the foreground will move across the field of view more quickly than objects in the distance, providing the brain with an indication of relative distance.

Figure 21:
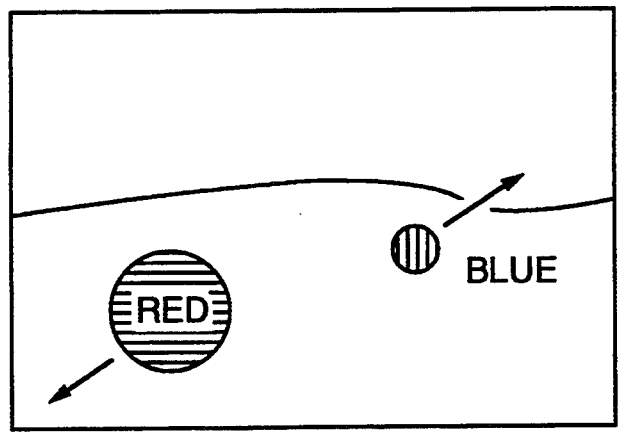

Turning now to FIG. 21, red objects appear closer than blue objects. Blue, which is perceived as the color of the sky, is integrated as a indication of distance.

Figure 22:
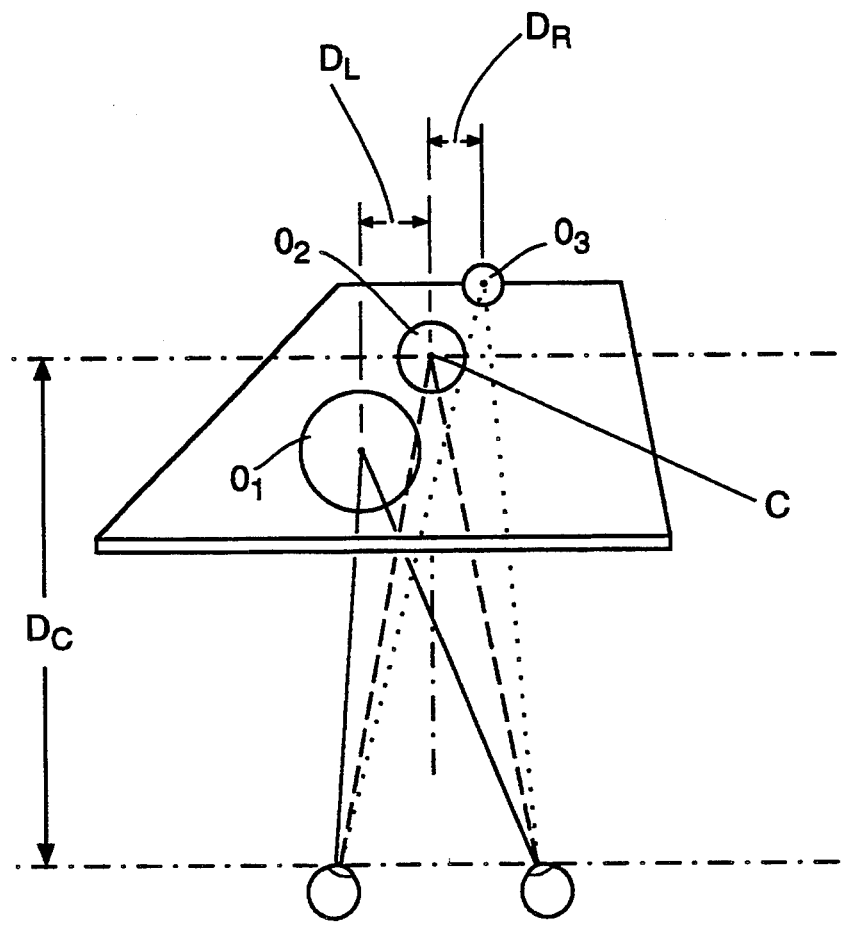
FIG. 22 illustrates a stereopsis configuration in connection with depth cues.

FIG. 22 illustrates the role of stereopsis in depth perception. Stereopsis is based on the angular convergence ability of the eyes, and permits the brain to compare the difference between the image viewed by the left eye and the image viewed by the right eye. An object $O_1$ closer than the distance $D_c$ of the convergence point C of the eyes is "shifted" to the left by the distance $D_L$. Likewise, an object $O_3$ which is further than the convergence distance $D_c$ appears to be shifted right by a distance $D_2$ relative to the convergence point C.

Stereopsis works in conjunction with psychological depth cues to define an image having depth relationships fully understandable by the brain. However, depth cues can operate independently of stereopsis to created depth perception in the brain. The present invention takes advantage of this characteristic of depth cues.

Depth cues as a whole are an understanding by the brain, both learned and inherited, of how depth is perceived by the eyes. This understanding is based on the manner in which objects appear in shape and depth, and how an image of the object is recorded in the brain's memory. To a large extent, these depth cues are a result of the evolution of human vision and are tied to environments commonly experienced in human life. Accordingly, depth perception underwater is often misleading because it is not an environment common in human experiences. Accordingly, underwater depth cues are not fully understandably by the human brain. Similarly, depth perception in outer space could be expected to be misleading since it is an environment unfamiliar to humans.

The human brain continually influences or corrects the vision process. As an example, an eye will typically cover a field of view about 180° horizontally and about 150° vertically. Despite the presence of the nose in the field of view, one does not notice it—the brain compensates for its presence.

As another example of how the brain corrects vision, depth perception remains even if one closes an eye. That is, even with one eye closed, a perceived image does not change to an entirely flat one, despite the lack of stereopsis. It is a simple matter for one to bring together fingers of opposite hands on outstretched arms. With only slightly more difficulty, it can still be done even with one eye closed, since the brain restores depth elements missing due to the lack of stereopsis.

Figure 23:
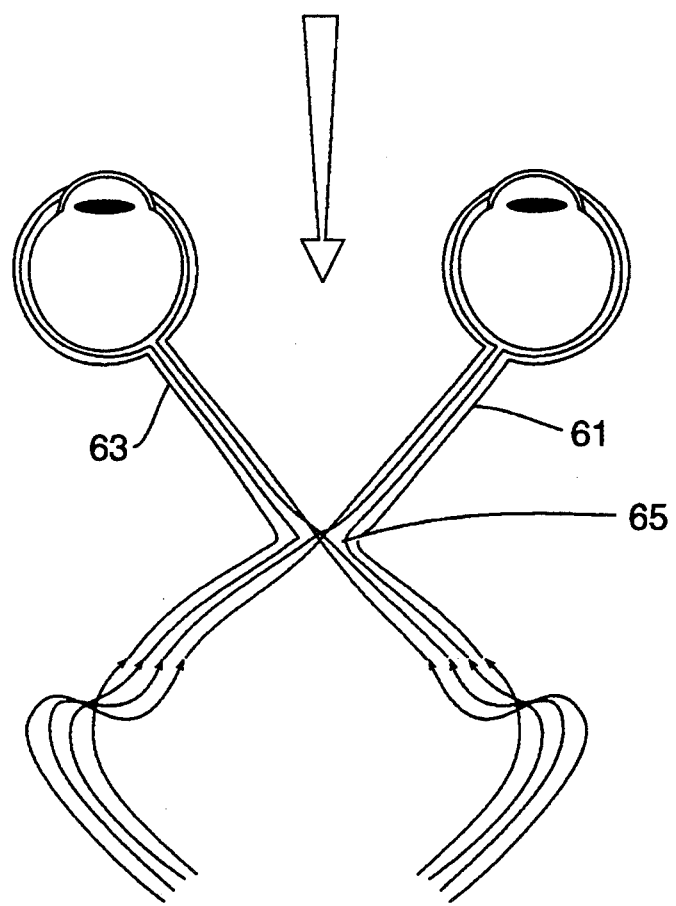
FIG. 23 is a schematic view illustrating the left and right optic nerves crossing at the chiasma region of the brain.

The vision process will be described in greater detail with reference to FIGS. 23 and 24. The right and left optic nerves, 61 and 63 respectively, cross at the chiasma region 65 of the brain. Roughly seventy percent of the nerve fibers cross the chiasma region to the opposite lobe of the brain. The remaining nerve fibers are connected to the brain lobe on the same side as the eye. As a result, one eye vision is never truly one eye vision since both hemispheres of the brain receive signals from each eye. This partial "double-vision" provides additional support for the depth cue elements which, like convergence, are transmitted to both hemispheres of the brain.

The present invention takes advantage of confusing or misleading image convergence information to force the brain to bring back the missing depth perception information through analysis of depth cues available in a flat image. Elements of depth, viewed from the flat image through the curved prismatic screen of the present invention, are perceived by the brain as partially real. The present invention allows the brain to perceive the depth cues as real without eye convergence information suggesting to the brain that the image is flat.

Figure 24:
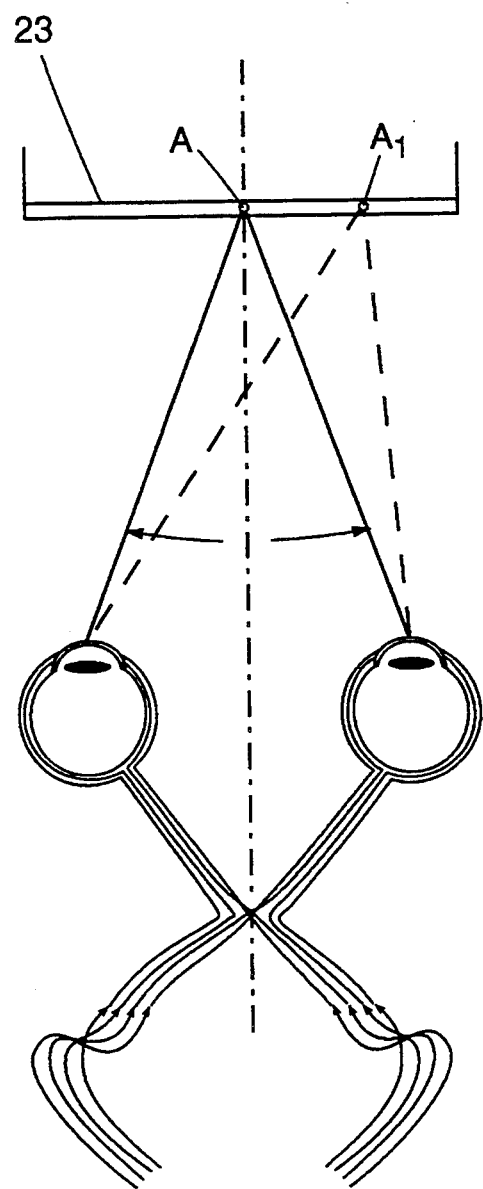
Figure 25:
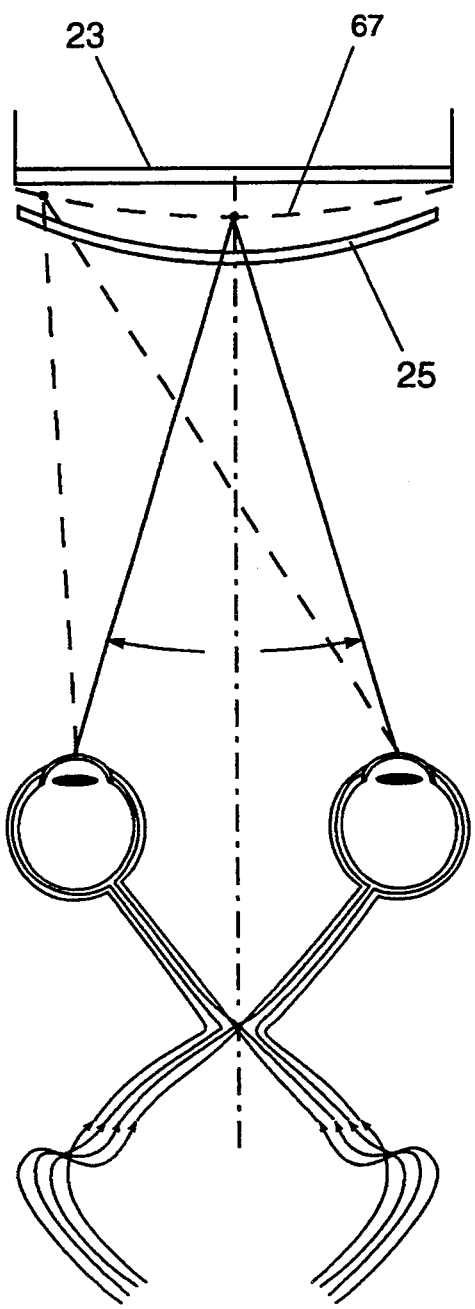
FIG. 25 illustrates the manner in which the eyes and brain perceive a depth image presented in accordance with the present invention.

Referring now to FIG. 24, a flat image is presented on a standard flat video screen 23. As a viewer's eyes move from point A on the screen to point $A_1$, the convergence does not change. Additionally, the eyes remain focussed at the same distance. The constant convergence and focus informs the brain that the observed image is flat.

In accordance with the preferred embodiment, a curved prismatic screen 25 placed in front of a flat video screen 23 causes the viewer to see a curved image 67. In this way, the convergence of the viewer's eyes varies as the eyes move from point to point on the image, indicating to the brain that the observed image is not flat. However, stereopsis "shifts" of image elements are not available to define for the brain which image elements are nearer and which are farther. Nonetheless, to reconcile conflicting image information, the brain interprets the depth elements remaining in the image and builds up an image with restored depth elements.

Figures 26, 27, 28:
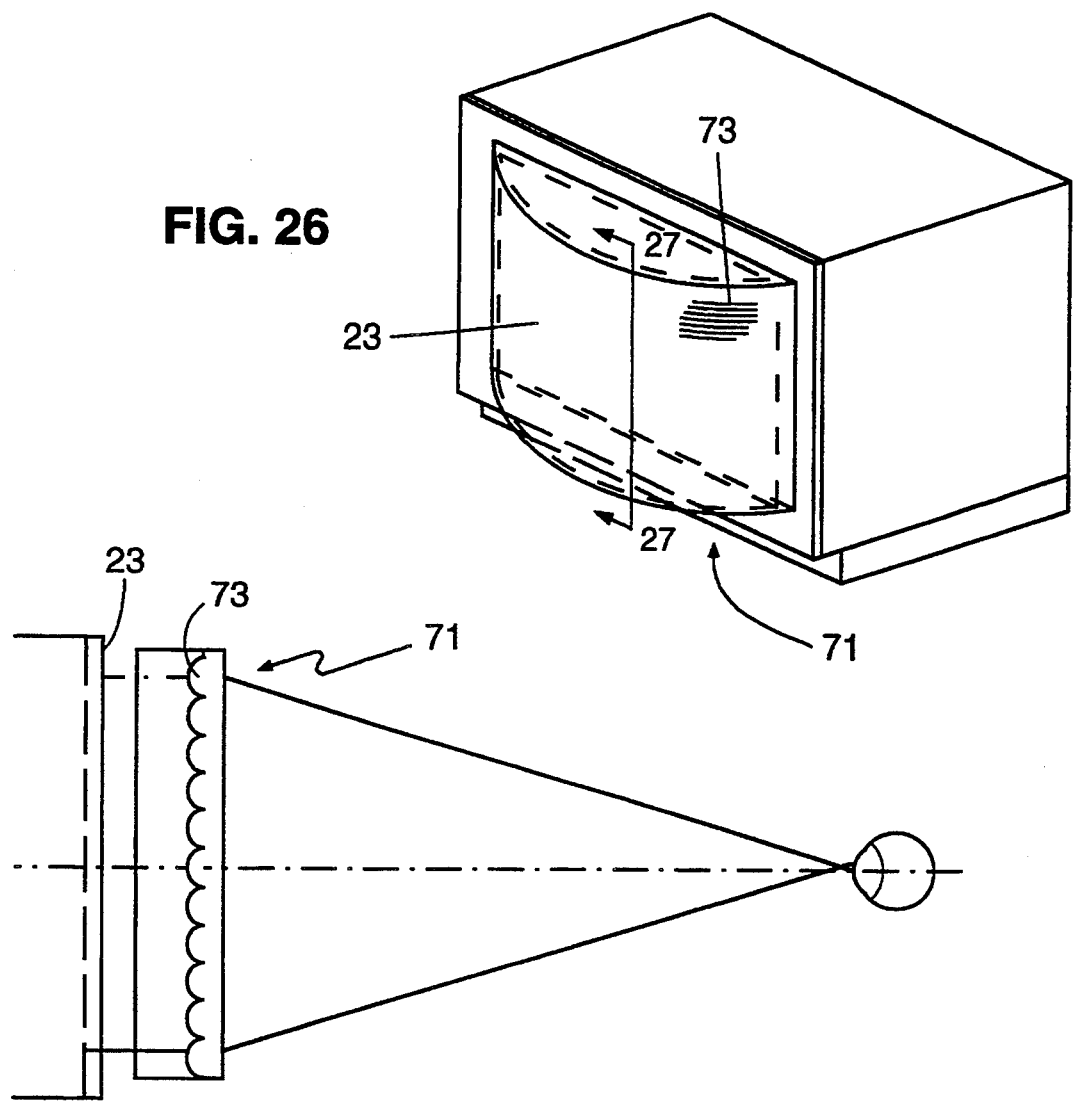
FIG. 26 is a perspective view of an alternative depth of field screen including lenticulas and constructed in accordance with the present invention.
FIG. 27 is a sectional view taken along lines 27—27 of FIG. 26.
FIG. 28 is a top view of the depth of field screen of FIGS. 26 and 27, illustrating focal differences.

A less preferred embodiment is described in connection with FIGS. 26–28. FIG. 26 is a perspective view of a curved lenticular screen 71 wherein the lenticulas 73 are placed on the surface of the depth of field screen curved in front of the video screen 23. FIG. 27 is a sectional view taken along lines 27—27 of FIG. 26, and more clearly illustrates the position of the lenticulas with respect to the video screen 23. As shown, the curved lenticular screen 71 includes a plurality of horizontal, cylindrical lenticulas 73 arranged generally parallel to the scan lines of the video monitor.

The focal distance of the curved lenticular screen 71 at the center point differs from the focal distance at the sides. Turning now to FIG. 28, the focal distance at the center of the screen is indicated by the distance A, whereas the focal distance at the sides is indicated by the distance B. To compensate for the differing focal distances across the depth of field screen, the lenticulas are formed with varying curvatures or diopters. Preferably the diopter of the lenticula is a function of the focal distance and varies along a continuum from the center of the screen to the respective edges.

In operation, the lenticular screen 71 curves and enlarges the video image to produce depth of field information in the perceived image. However, the lenticular screen tends to be relatively cumbersome and expensive to manufacture. Furthermore, the viewer is limited to a viewing distance within a fairly narrow range.

In addition to providing depth of field information, the present invention helps enhance the quality of a viewed image. This enhancement is based on optical considerations as well as on physiological and psychological aspects of vision. Briefly, the present invention enhances the quality of a viewed video image by increasing sharpness and contrast in the perceived image. Additionally, for example, a large portion of electronic "noise" and "grain" may be eliminated from images that have been transferred from film to videotape.

Figure 30:
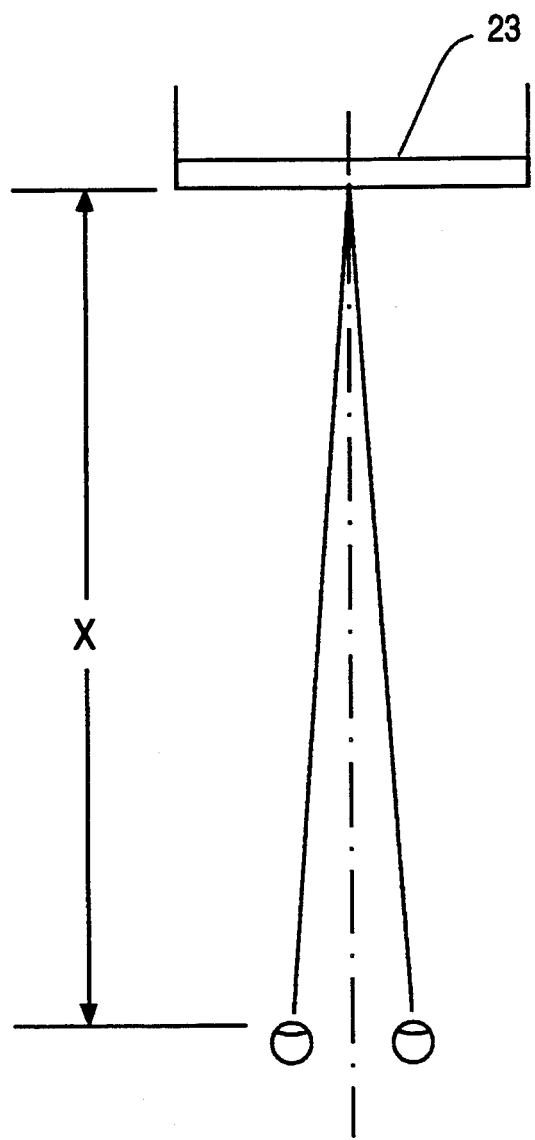
FIG. 30 demonstrates the viewing distance at which the scanning lines of the video monitor screen of FIG. 29 are not visible.
Figure 31:
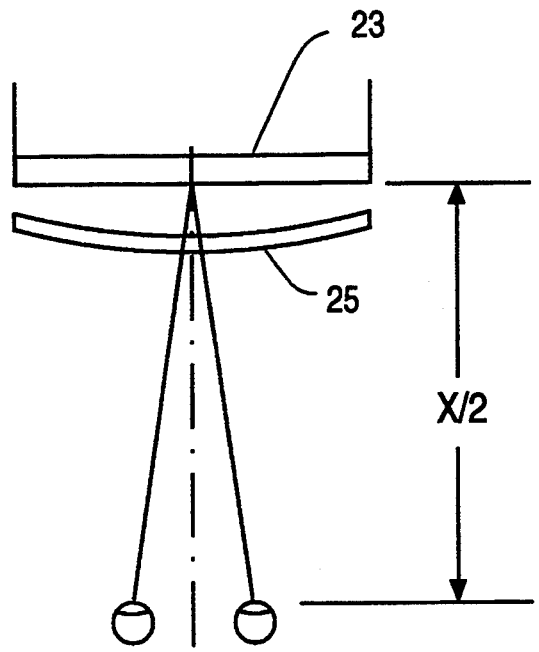
FIG. 31 demonstrates a depth of field arrangement in accordance with the present inventions whereby the viewing distance at which the scanning lines of the video monitor screen are not visible is reduced.
Figure 29:
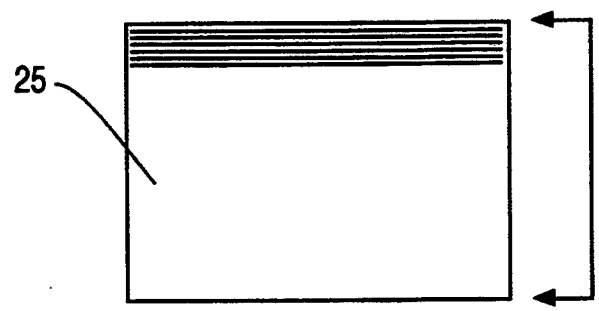
FIG. 29 illustrates a video monitor screen having 400 scanning lines of image resolution.

Referring to FIG. 29, the prism structure of a depth of field screen 25 appears as a miniature horizontal grid arrangement which restructures the video image lines into smaller elements. Even with flat screens which do not provide depth of field viewing, improved image quality may be obtained by restructuring the video image lines into smaller elements. When viewing a 19" video screen 23 having 400 lines of image resolution, the scan lines are visible up to a distance x in FIG. 30. However, with reference to FIG. 31, a depth of field screen 25 which provides 1200 lines of resolution reduces the distance at which the image resolution lines disappear to x/2. Hence, viewers can observe the image more closely without seeing individual scan lines.

Figure 32A:
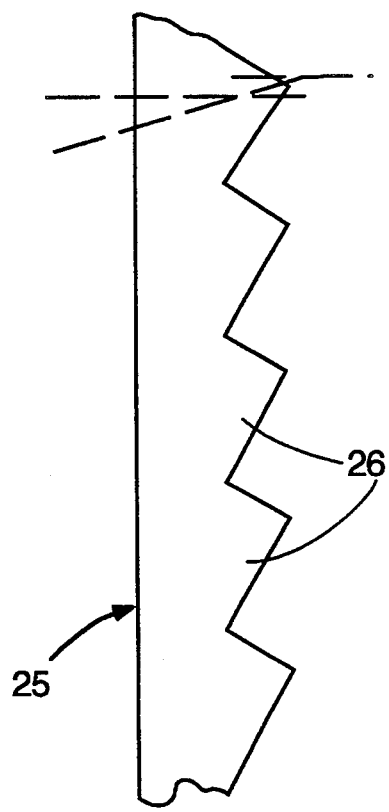
FIGS. 32(a) and 32(b) are an enlarged sectional side view and a corresponding front view, respectively, of prisms of a depth of field screen in accordance with the present invention.
Figure 32B:
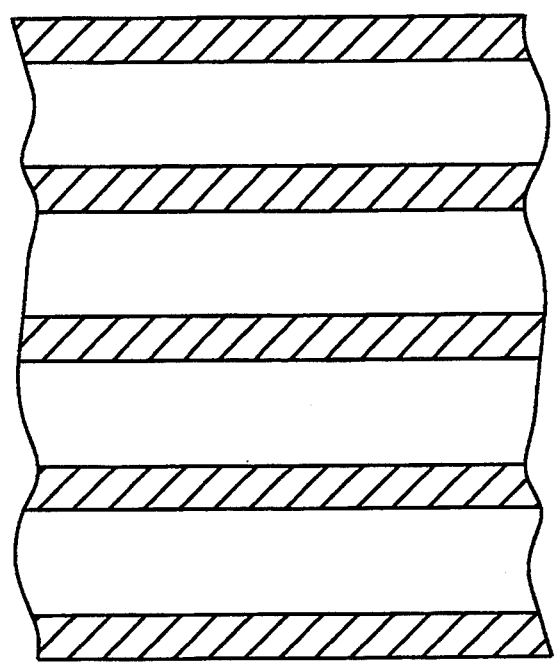

A magnified sectional side view of a depth of field screen 25 is shown in FIG. 32($a$). FIG. 32($b$) is a corresponding front view of the depth of field screen of FIG. 32($a$). As illustrated in FIG. 32($a$), microprisms 26 are arranged vertically one above the other. From the front view of FIG. 32($b$), the microprisms 26 appear to be separated by horizontal lines. At very close viewing the horizontal lines appear as a microscopic grid. As will be described below in greater detail, this microscopic grid improves the viewed image quality.

Turning now to FIGS. 33($a$) and 33($b$), a vertical line $L_1$ is shown as viewed on a standard video screen and through a depth of field screen, respectively. As can be seen in FIG. 33($b$), the depth of field screen breaks the image lines of the vertical line $L_1$ into smaller divided elements. For example, with reference to FIGS. 34($a$) and 34($b$), a standard video image with 400 lines of image resolution (FIG. 34($a$)) may be viewed through a depth of field screen with 1200 resolution lines (FIG. 34($b$)). Each video image resolution line in the original video image is viewed through two prisms of the depth of field screen. Hence, the vertical line element of the original image on the video screen is divided twice by the prisms of the depth of field screen. As noted above, this effect reduces the distance at which the image resolution lines are visible to a viewer.

Figure 35A:
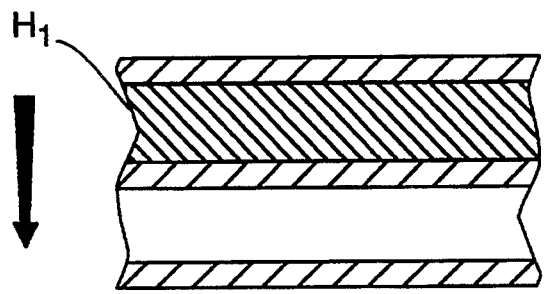
FIG. 35(a) illustrates a video screen resolution line with a horizontal line image moving downward.
Figure 35B:
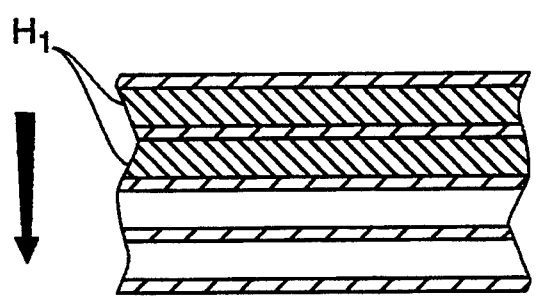
FIG. 35(b) illustrates the downwardly moving horizontal line image of FIG. 35(a) restructured into two downwardly moving horizontal line images in accordance with the present invention.

FIG. 35($a$) illustrates a horizontal video image line $H_1$ which is moving downward in the direction of the arrow. FIG. 35($b$) illustrates the same horizontal video image line as viewed through a depth of field screen. As can be seen, the horizontal line is divided by the depth of field screen into two smaller lines. The image "switches" from one groove of prism lines to the next as it moves downwardly. As a result, the horizontal line $H_1$ disappears momentarily before reappearing again in the next prism groove, appearing to fade in and out. The frequency at which the image signals are interrupted improves the perceived image sharpness and contrast.

A video image includes a large number of pixels arranged in lines. These pixels are selectively illuminated to form the video image. However, grain or noise in the video image causes a number of pixels to be illuminated seemingly at random, thereby distorting the video image and reducing its sharpness and stability. Restructuring the video image in accordance with the present invention effects the noise or grain elements of the image to thereby improve the perceived video image.

Figure 36A:
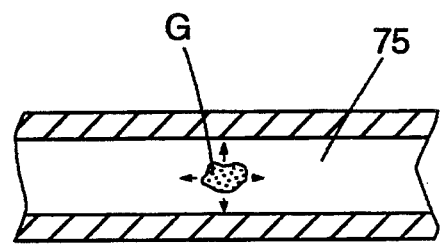
FIGS. 36(a) and 36(b) respectively illustrate a video screen resolution line with a moveable "grain" element, and the grain element restructured in accordance with the present invention into two smaller images.
Figure 36B:
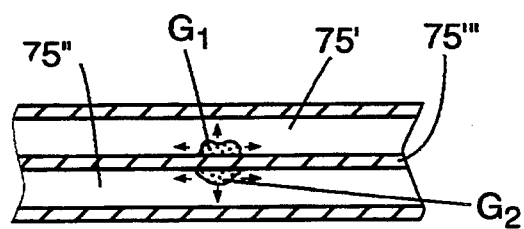

A grain element G is shown in FIG. 36($a$), as viewed on a standard video screen. The same grain dement, when viewed through a prismatic depth of field screen, is restructured into smaller grain elements $G_1$ and $G_2$, as shown in FIG. 36($b$). More specifically, a video scan line 75 is divided by the depth of field screen into two prismatic screen line elements 75' and 75''. A dark zone section line 75''' separates the line elements 75' and 75''. Due to the relatively small size of the individual grain elements $G_1$ and $G_2$, the grain is less visible when the image is pieced together by the brain, thus providing an image with increased sharpness. The small grain elements tend to be perceived as a single element, without the empty space in between being perceived. As a result, the depth of field screen improves the resolution of the viewed image. To enhance image contrast, light reflections from bright objects and light sources placed in front of the video screen should be eliminated. This is particularly important, for example, in operating room environments which, typically, are brightly illuminated. In accordance with another aspect of the present invention, an anti-reflection coating is provided on the depth of field screen to help eliminate light which is reflected from the exterior surface of the depth of field screen, light which is reflected in the screen prisms, and light which passes through the depth of field screen and is reflected from the flat video screen.

Preferably, an anti-reflection coating is applied to both the front and rear surface of the depth of field screen. The coating is ideally a broadband anti-reflection coating having a reflectance R less than approximately 0.4% over the applicable wavelength regions. Scatter and absorption loss over the wavelength region is preferably less than 0.25%. Furthermore, the anti-reflection coating should be insoluble in water, acetone, alcohol, detergents and most acids.

Figure 37:
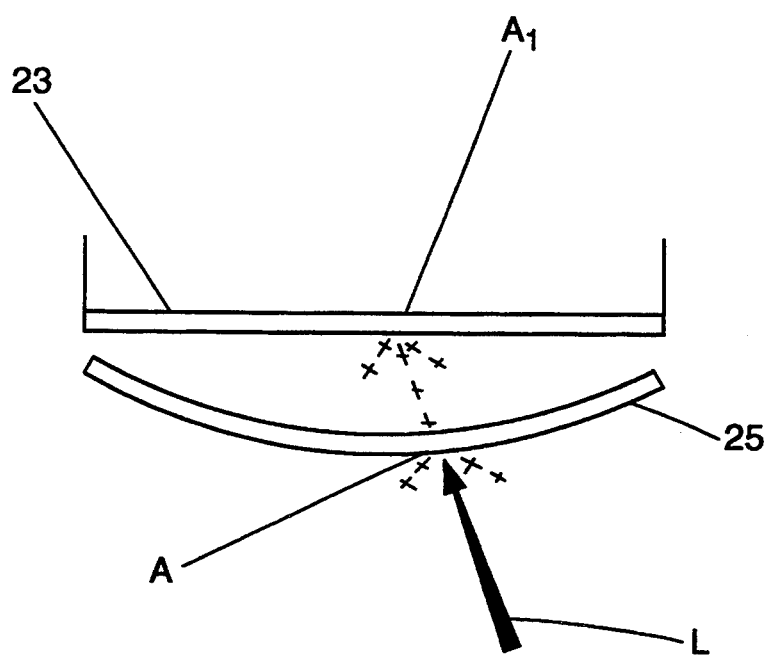
FIG. 37 illustrates the manner in which a depth of field screen protects the video display from reflected light.

As shown in FIG. 37, a depth of field screen 25 which has been coated with an anti-reflection coating is placed in front of a video screen 23. A light beam L directed at the video screen strikes the depth of field screen at point A and, to a large extent, is absorbed by the anti-reflection coating. Accordingly, light is not reflected back into the eyes of the viewer. Additionally, light is prevented from reaching the video screen 23, leading to increased contrast of the image. In short, when coated with the anti-reflection coating, the depth of field screen operates as a shield preventing unwanted light A' from reaching the video screen 23. Of course, further shielding may be provided, for example, by the light shading hood 31 of FIG. 6.

In addition to the features and advantages noted above, the present invention helps reduce eye fatigue caused by prolonged viewing of a video screen. According to medical and scientific research reported in 1993 by the New England Journal of Medicine, eye fatigue associated with prolonged computer use may result in blurred images, redness of the eyes, over-sensitivity to bright objects, irritation caused by diminished cleansing of the eye surface by blinking, reduced ability to concentrate, a burning sensation in the eyes, and headaches. It has been shown that when a person looks for any extended period of time at a flat image on a computer screen, the eyes tend to become strained and build up tension. Furthermore, frequency of blinking may be reduced to one-third the normal rate. Eyelids effectively work like windshield wipers as they blink. The movement of the eyelids triggers moisture which helps to eliminate inflammation caused by bacteria, and further cleanses the eye surface. Also, blinking allows a brief resting period to the portion of the brain that controls vision. Medical and work place studies have shown eye fatigue and the associated effects to be a major problem for computer operators who, after several hours of computer use, tend to become highly unproductive.

The present invention helps reduce problems associated with eye fatigue. Referring again to FIG. 12, when an image is viewed through the depth of field screen, convergence and focal distances are no longer constant as the eyes move to different points on the image. As a result, problems resulting from viewing a flat image are reduced. The depth of field screen helps reduce eye fatigue by reducing reflected light by eighty percent or more, by restoring most of the depth in a normal image to increase eye blinking, by relieving tension that leads to eye fatigue, and by helping the eyes to function more like they do in normal depth of field viewing.

Figure 38:
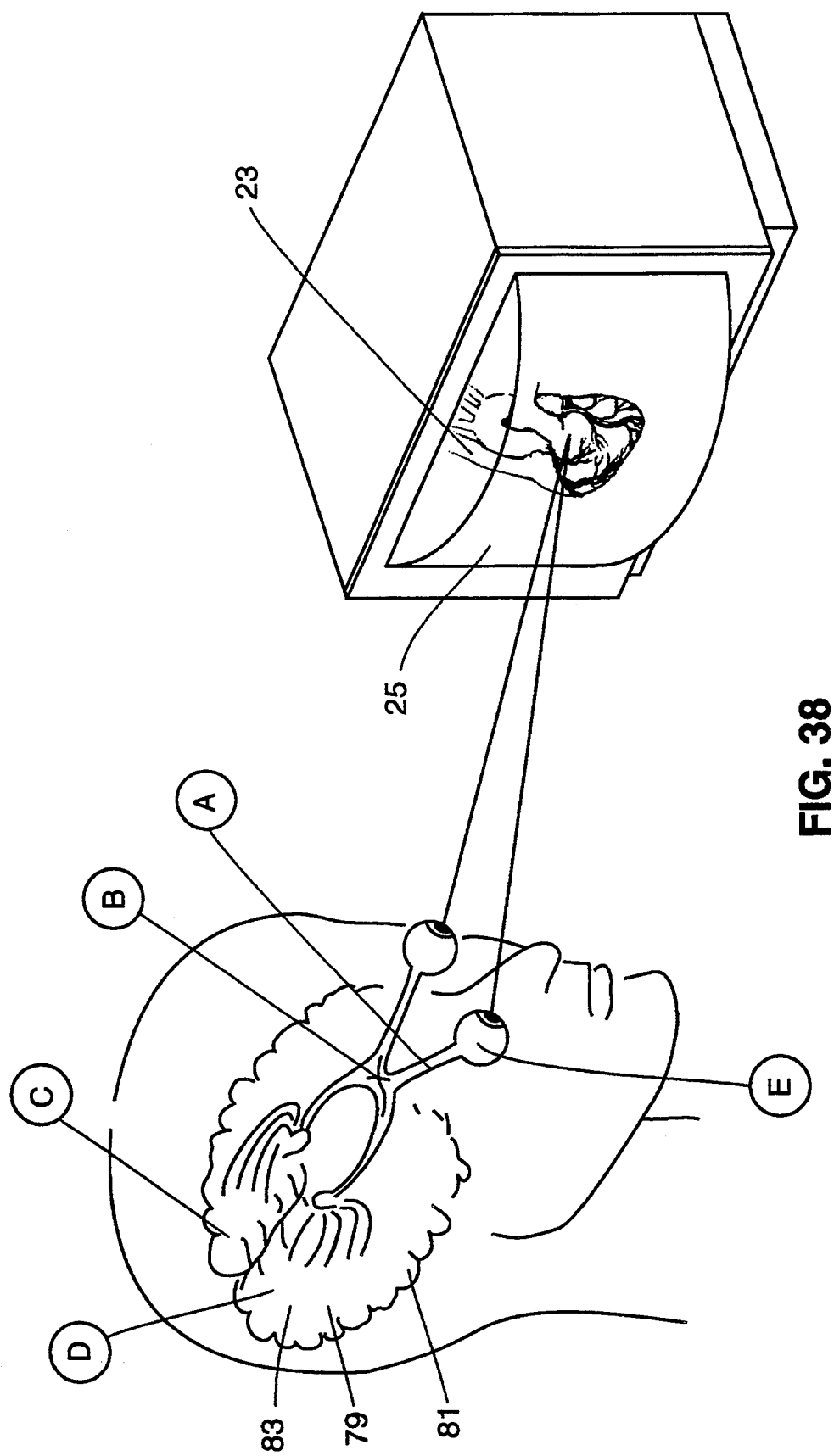
FIG. 38 illustrates a depth of field screen in relation to the visual function portions of the brain.

A summary of the operation of the depth of field screen in accordance with the present invention is described in connection with FIG. 38. The depth of field screen provides an improved image due to the response of the brain to image elements perceived by the eyes viewing an image through a screen 25 placed in front of a flat image video screen 23. Characteristics of the effect of the depth of field screen 25 on the perceived image are described below.

(A) A flat video screen does not provide a visual disparity such as is provided with a regular stereo image. However, when a viewer looks at the flat image through the depth of field screen, convergence of the viewer's eyes varies as the eyes move from point to point on the image. This provides a signal to the brain that the image is not flat. As a result, the brain analyzes depth cues present in the image to add the depth elements missing due to the lack of stereopsis.

(B) Optic nerves crossing the chiasma region of the brain supply depth cue information to both hemispheres of the brain. Partial "double vision" is provided since only a portion of optic nerve fibers (about 70%) cross the chiasma region to the opposite hemisphere. The present invention takes advantage of the resulting depth cue support to help provide a depth of field image.

(C) Depth cues in a perceived image are supplemented by memory experiences for similar objects. These memory experiences are both inherited and learned. Such memory experiences may be stored, for example, in the motion depth portion 79 of the brain or in the color depth section 81 of the brain. The vision process analyzes an image observed by the eyes (including depth cues) in conjunction with the memory experiences to more fully understand the image.

(D) The grid-like image provided by the multi-prism screen restructures grain images and electronic noise into smaller elements, which are combined in a perceived image. The resulting image has improved sharpness.

(E) By changing a flat image into a depth image, the depth of field screen forces the eyelids to maintain the rate of blinking at near normal value, thus reducing eye fatigue and irritation. Blinking also permits the vision command portion 83 of the brain to rest briefly. The anti-reflection coating on the depth of field screen further reduces eye strain by minimizing glare. Additionally, the anti-reflection coating increases image contrast and provides a more realistic image.

A further embodiment of the present invention, and its operation in connection with these characteristics, is described in connection with FIG. 39, which relates to the display of an image from a sonic imaging probe. Sonic imaging, such as echo-sonar, acoustic or ultrasonic devices, is employed in numerous technical applications. One such application of extreme importance is as a safe alternative to X-ray imaging in examining interior portions of the human body. Typically, however, such applications provide relatively poor quality images which project shadows of objects such as internal organs, rather than clearly defining the shape. Furthermore, these images are often largely distorted by amplified electronic noise. Accurately reading such images requires a great deal of practice and expertise, and still involves a degree of interpretation.

Figure 39:
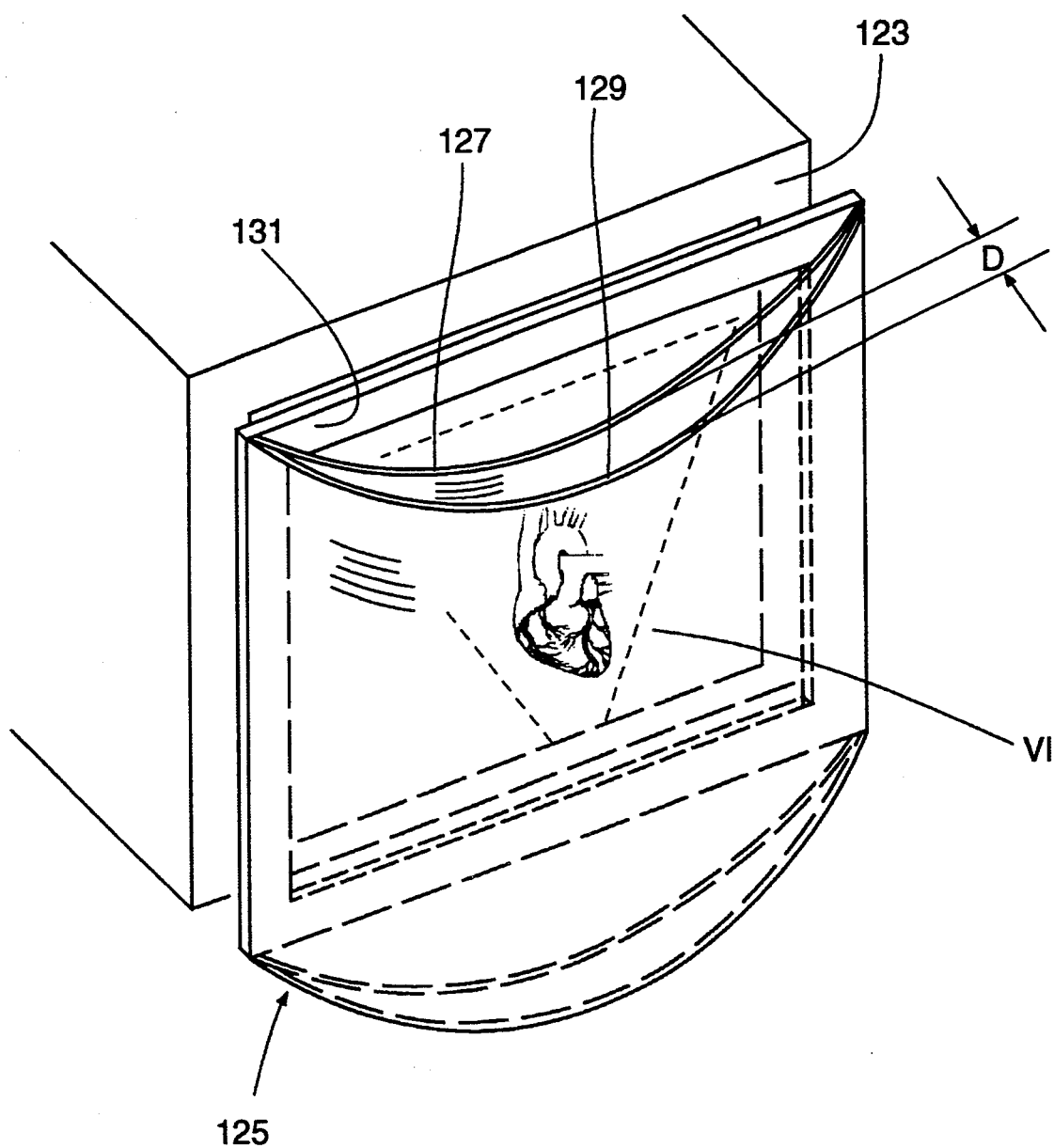
FIG. 39 illustrates a further embodiment in accordance with the present invention.

In FIG. 39, a video monitor 123 produces an image V1. A double depth of field screen 125 is arranged in front of the video monitor 123, and includes a pair of curved prismatic screens 121 and 129 mounted adjacent one another on a frame 131. As shown, the double screen 125 includes an inner screen 127 and an outer screen 129. The screens 127 and 129 are preferably separated at their vertical center lines by a distance D. For a 19" video monitor, the value D may be approximately two inches. The frame 131 may be interchangeable and may be adapted to fit within the depth of field housing discussed in connection with FIGS. 5 and 6.

In operation, the inner prismatic screen 127 restructures each of the four hundred resolution lines of the video image into three lines—i.e., two image lines and one dividing line. The resulting twelve hundred lines are further restructured by the outer prismatic screen 129 into additional resolution lines. Accordingly, the displayed acoustic image is restructured into very small elements and has substantially reduced grain. The curve of the double prismatic screen 125 also causes the viewed image to be analyzed in accordance with shadow depth cues, supplemented with visual memory experiences. As a result, the shape of the perceived image of the internal organ or the like is more readily seen.

When viewing a sonic image of the human heart on a standard video monitor, the screen is cluttered with electronic noise. This noise makes it very difficult for the attending physician to examine the heart effectively because the image is continually breaking up. The same sonic image, however, when viewed through the double prismatic screen of FIG. 39, provides the physician with not only an image of the heart's shape, but also with clearer information concerning the structure of the heart chambers and valves. To enhance depth of field viewing of sonograms, echocardiography and MRI images, a blue filter—mired shift 68 with a 52% transmission, can be placed at the rear of the prismatic screen 127.

Figure 40:
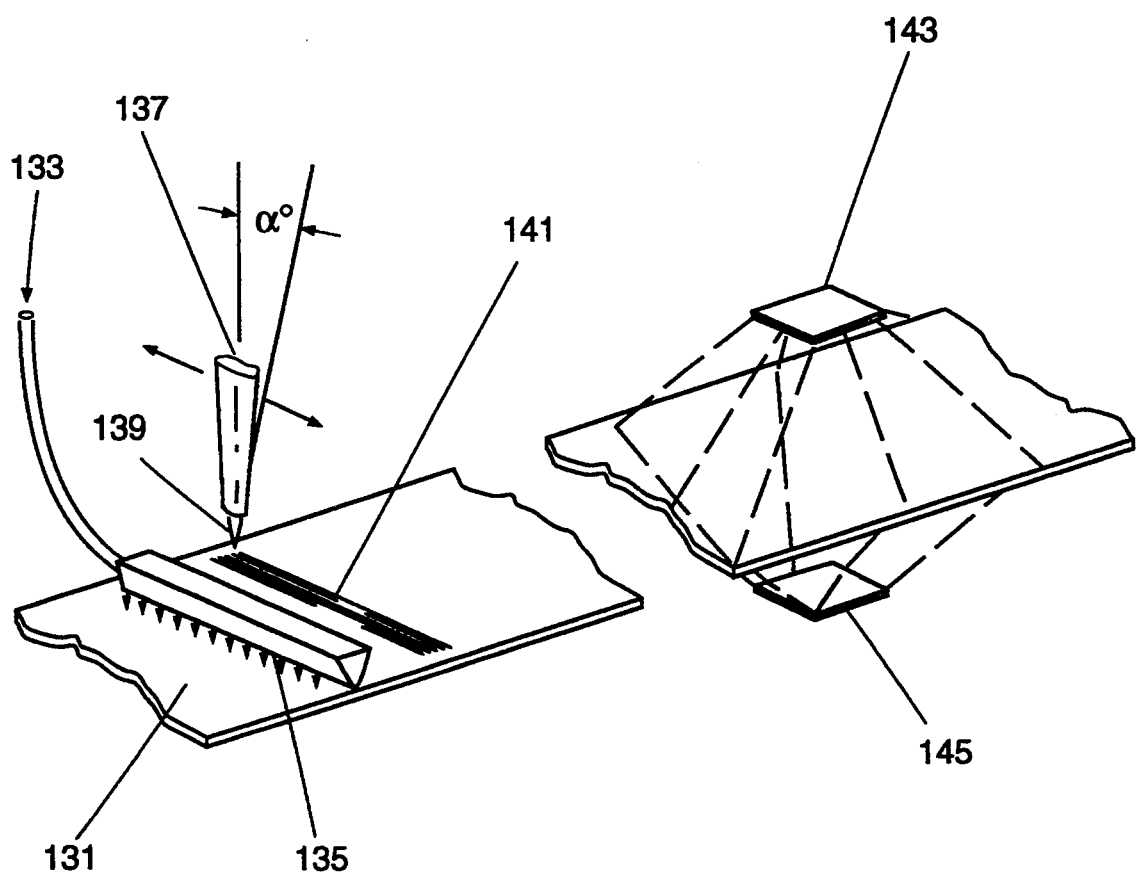
FIG. 40 illustrates a preferred manufacturing technique useful in connection with the present invention.

The preferred process-for manufacturing prismatic screens in accordance with the present invention is discussed in conjunction with FIG. 40. Of course, manufacturing techniques will vary in accordance with the particular needs of the application and the transparent material that is selected for the prismatic screen. A continuous sheet or film 131 of plastic screen material may be passed along a conveyor or other suitable transport apparatus. Hot air is directed through a supply hose 133 to a distribution plenum 135 arranged over the plastic sheet 131. The hot air softens the plastic material before the prisms are cut, making the resulting prisms optically clearer and eliminating the necessity of an extra polishing step.

A standard milling machine arm 137 is provided with a conventional diamond cutting tool 139 for cutting the prism lines 141 in the screen material 131. The milling machine arm 137 may be tilted by an angle α if square prisms are not desired. The milling arm 137 may be part of any standard milling device and preferably operates under computer control. To speed the milling process, the milling tool can be operated by a turbine which drives the tool up to 100,000 rpms.

Mother process for manufacture of the prism structures for the curved prismatic screen involves constructing a rotating drum under which a sheet or film of heated plastic is passed. The drum includes a grid pattern which is pressed into the softened plastic as it passes beneath the drum to form the prism structures. Once the screen has cooled, it should be polished to optical grade. The sheet may then be cut to size and placed in an appropriate frame.

Following cutting of the prism lines, the sheet 131 passes coating electrodes 143 and 145 for application of the anti-reflection coating in a conventional manner. After the anti-reflection coating is properly set, the sheet may be cut to length and mounted in a frame for use as described above.

The principles, preferred embodiments and modes of operation of the present invention have been described in the foregoing specification. The invention which is sought to be protected herein, however, is not to be considered as limited to the particular forms disclosed, since these are to be regarded as illustrative rather than restrictive. Variations and changes may be made by those skilled in the art without departing from the spirit of the invention. For example, the present invention is not limited to viewing of a video screen image, but may be used in viewing any image which includes recorded depth cues. Such images include computer images, high definition television images, projected film images, still photographs and slides, transparencies, printed images and works of art.

What is claimed is:

1. An apparatus for depth of field viewing of flat images by restructuring the images to restore depth in the image through interchange of perceived depth cues in place of stereopsis, comprising:
    a first transparent screen for positioning between a flat image and a viewer, said first transparent screen having a center portion and two side portions, and being curved across its width such that the center portion of the screen is arranged at a distance from the flat image greater than that of the side portions; and
    a first plurality of optical elements formed in said first transparent screen and extending horizontally across the width of the screen, each of said optical elements being vertically spaced one above the other.

2. The apparatus of claim 1, wherein said optical elements are prisms which extend across the width of said first transparent screen.

3. The apparatus of claim 2, wherein said prisms are provided at a density from 60 prisms per linear inch to 160 prisms per linear inch.

4. The apparatus of claim 3, wherein the sides of the prism define an angle from 60' to 95'.

5. The apparatus of claim 4, wherein the prisms are tilted at an angle from 0' to ±40'.

6. The apparatus of claim 4, wherein the prisms are symmetric.

7. The apparatus of claim 2, wherein the sides of the prism define an angle from 60' to 95'.

8. The apparatus of claim 7, wherein the prisms are tilted at an angle from 0' to ±40'.

9. The apparatus of claim 7, wherein the prisms are symmetric.

10. The apparatus of claim 1, wherein the prisms are tilted at an angle from 0' to ±40'.

11. The apparatus of claim 1, wherein the prisms are symmetric.

12. The apparatus of claim 1, wherein said optical elements are cylindrical lenticulas, said lenticulas having a diopter which varies across the width of the first transparent screen as a function of the distance of the screen from the flat image.

13. The apparatus of claim 1, further comprising a frame for said first transparent screen, said frame being adapted to mount the screen on a video monitor.

14. The apparatus of claim 13, wherein said frame includes a light hood for shielding the first transparent screen and the flat image from ambient light.

15. The apparatus of claim 14, wherein said first transparent screen includes an anti-reflection coating.

16. The apparatus of claim 1, further comprising a second transparent screen provided adjacent said first transparent screen, said second transparent screen including a plurality of optical elements formed in said second transparent screen and extending horizontally across the width of the second screen, each of said optical elements being vertically spaced one above the other.

17. The apparatus of claim 16, wherein at least one of said first plurality of optical elements and said second plurality of optical elements comprises prisms.

18. The apparatus of claim 17, wherein at least one of said first transparent screen and said second transparent screen includes an anti-reflection coating.

19. The apparatus of claim 1, wherein said first transparent screen includes an anti-reflection coating.

20. An apparatus for depth of field viewing of flat images by restructuring the images to restore depth in the image through interchange of perceived depth cues in place of stereopsis, comprising:
  a frame for positioning between a flat image and a viewer;
  a first transparent screen provided in said frame and having a center portion and two side portions, said first transparent screen being curved across its width such that the center portion of the screen is arranged at a distance from the flat image greater than that of the side portions;
  a first plurality of optical elements formed in said first transparent screen and extending horizontally across the width of the screen, each of said optical elements being vertically spaced one above the other; and
  a second transparent screen provided in said frame adjacent said first transparent screen, said second transparent screen having a center portion and two side portions, and being curved across its width such that the center portion of the screen is arranged at a distance from the flat image greater than that of the side portions and greater than the distance from the image to the center of said first transparent screen; and
  a second plurality of optical elements formed in said second transparent screen and extending horizontally across the width of the screen, each of said optical elements being vertically spaced one above the other.

21. The apparatus of claim 20, wherein at least one of said first plurality of optical elements and said second plurality of optical elements comprises prisms.

22. The apparatus of claim 21, wherein said prisms are provided at a density from 60 prisms per linear inch to 160 prisms per linear inch.

23. The apparatus of claim 21, wherein the sides of the prism define an angle from 60' to 95'.

24. The apparatus of claim 21, wherein the prisms are tilted at an angle from 0' to ±40'.

25. The apparatus of claim 21, wherein the prisms are symmetric.

26. The apparatus of claim 20, wherein said frame includes a light hood for shielding said first transparent screen, said second transparent screen and the flat image from ambient light.

27. The apparatus of claim 20, wherein at least one of said first transparent screen and said second transparent screen includes an anti-reflection coating.

28. The apparatus of claim 20, wherein said flat image is one of a sonogram image, an echocardiography image and an magnetic resonance imaging image.

29. The apparatus of claim 20, further including a blue filter provided adjacent said first transparent screen.

30. An apparatus for depth of field viewing of flat images by restructuring the images to restore depth in the image through interchange of perceived depth cues in place of stereopsis, comprising:
  a display for said flat image;
  a transparent screen positioned between said display and a viewer, said transparent screen having a center portion and two side portions, and being curved across its width such that the center portion of the screen is arranged at a distance from the display greater than that of the side portions; and
  a plurality of optical elements formed in said transparent screen and extending horizontally across the width of the screen, each of said optical elements being vertically spaced one above the other.

31. The apparatus of claim 30, wherein said display is a video monitor.

32. The apparatus of claim 31, wherein said optical elements are prisms which extend across the width of said first transparent screen.

33. The apparatus of claim 32, wherein said prisms are provided at a density from 60 prisms per linear inch to 160 prisms per linear inch.

34. The apparatus of claim 33, wherein the sides of the prism define an angle from 60' to 95'.

35. The apparatus of claim 34, wherein the prisms are tilted at an angle from 0' to ±40'.

36. The apparatus of claim 34, wherein the prisms are symmetric.

* * * * *